(12) United States Patent
Xu et al.

(10) Patent No.: US 11,630,250 B2
(45) Date of Patent: Apr. 18, 2023

(54) SYSTEM FOR USE IN IMAGING IN AIR

(71) Applicant: FUTURUS TECHNOLOGY CO., LTD., Beijing (CN)

(72) Inventors: Junfeng Xu, Beijing (CN); Tao Fang, Beijing (CN)

(73) Assignee: FUTUROS TECHNOLOGY CO., LTD., Beijing (CN)

( * ) Notice: Subject to any disclaimer, the term of this patent is extended or adjusted under 35 U.S.C. 154(b) by 824 days.

(21) Appl. No.: 16/467,607

(22) PCT Filed: Dec. 6, 2017

(86) PCT No.: PCT/CN2017/114851
§ 371 (c)(1),
(2) Date: Jun. 7, 2019

(87) PCT Pub. No.: WO2018/103670
PCT Pub. Date: Jun. 14, 2018

(65) Prior Publication Data
US 2020/0073136 A1  Mar. 5, 2020

(30) Foreign Application Priority Data

Dec. 8, 2016 (CN) .......................... 201611124003.1
Dec. 5, 2017 (CN) .......................... 201711269267.0
(Continued)

(51) Int. Cl.
*G02B 5/124* (2006.01)
*G02B 30/56* (2020.01)
(Continued)

(52) U.S. Cl.
CPC ................ *G02B 5/124* (2013.01); *G02B 1/11* (2013.01); *G02B 5/128* (2013.01); *G02B 5/13* (2013.01);
(Continued)

(58) Field of Classification Search
CPC ........ G02B 5/124; G02B 5/126; G02B 5/128; G02B 5/13; G02B 5/3083; G02B 5/136;
(Continued)

(56) References Cited

U.S. PATENT DOCUMENTS 5,764,411 A   6/1998  Shanks
5,861,993 A   1/1999  Shanks et al.
(Continued)

FOREIGN PATENT DOCUMENTS

CN   101315465 A   12/2008
CN   101680976 A    3/2010
(Continued)

OTHER PUBLICATIONS

Office Action issued in U.S. Appl. No. 15/398,194 dated Jun. 27, 2017.
(Continued)

*Primary Examiner* — Jade R Chwasz
*Assistant Examiner* — Jyotsna V Dabbi
(74) *Attorney, Agent, or Firm* — Dilworth & Barrese, LLP.; Michael J. Musella, Esq.

(57) ABSTRACT

A system for use in imaging in the air, including: an image source, a transflective mirror and a retroreflective element. Light emitted by the image source is irradiated onto the retroreflective element after being reflected by the transflective mirror, the light is reflected on the retroreflective element and emerges in an opposite direction along an original incident path, and after being transmitted by the transflective mirror, then forms a real image. A selective transmissive film is provided on a side of the transflective mirror facing the image source, and a phase delay optical element is provided on a side of the retroreflective element facing the transflective mirror such that first linearly polarized light incident on the retroreflective element from the
(Continued)

transflective mirror becomes circularly polarized light after passing through the phase delay optical element.

20 Claims, 9 Drawing Sheets

(30) Foreign Application Priority Data

| Dec. 5, 2017 | (CN) | 201711270401.9 |
| Dec. 5, 2017 | (CN) | 201711271270.6 |
| Dec. 5, 2017 | (CN) | 201711271272.5 |

(51) Int. Cl.
| G02B 1/11 | (2015.01) |
| G02B 5/13 | (2006.01) |
| G02B 5/128 | (2006.01) |
| G02B 27/14 | (2006.01) |
| G03B 21/00 | (2006.01) |
| G02B 5/30 | (2006.01) |

(52) U.S. Cl.
CPC ........... *G02B 5/3083* (2013.01); *G02B 27/14* (2013.01); *G02B 30/56* (2020.01); *G03B 21/00* (2013.01)

(58) Field of Classification Search
CPC ............. G02B 27/14; G02B 27/2292; G02B 27/0172; G02B 27/28; G02B 27/283; G02B 27/286; G02B 30/56; G02B 1/11; G03B 21/00
USPC ................ 359/479, 529, 530, 534, 489, 542
See application file for complete search history.

(56) References Cited

U.S. PATENT DOCUMENTS

| 6,005,835 | A | * | 12/1999 | Tsuji | G02B 27/4238 |
| | | | | | 369/103 |
| 6,147,805 | A | | 11/2000 | Fergason | |
| 6,243,201 | B1 | | 6/2001 | Fleming et al. | |
| 6,379,009 | B1 | | 4/2002 | Fergason | |
| 6,798,579 | B2 | | 9/2004 | Robinson et al. | |
| 6,890,634 | B1 | | 5/2005 | Yoon et al. | |
| 7,033,207 | B2 | | 4/2006 | Nimura | |
| 7,133,207 | B2 | | 11/2006 | Travers | |
| 7,965,448 | B2 | | 6/2011 | Maekawa | |
| 2004/0136082 | A1 | * | 7/2004 | Cado | G02B 27/0101 |
| | | | | | 351/159.56 |
| 2004/0169928 | A1 | | 9/2004 | Nilsen et al. | |
| 2006/0007055 | A1 | * | 1/2006 | Larson | G02B 27/0101 |
| | | | | | 345/8 |
| 2009/0073552 | A1 | | 3/2009 | Yokoi | |
| 2009/0232509 | A1 | | 9/2009 | Heikenfeld et al. | |
| 2010/0177402 | A1 | | 7/2010 | Maekawa | |
| 2011/0228392 | A1 | | 9/2011 | Yang et al. | |
| 2014/0055858 | A1 | | 2/2014 | Chapman | |
| 2014/0177063 | A1 | | 6/2014 | Wang et al. | |
| 2015/0103392 | A1 | | 4/2015 | Rieger | |
| 2015/0153577 | A1 | | 6/2015 | Nikitin et al. | |
| 2015/0248014 | A1 | | 9/2015 | Powell et al. | |
| 2016/0103255 | A1 | | 4/2016 | Powell et al. | |
| 2016/0291326 | A1 | | 10/2016 | Evans et al. | |
| 2017/0285402 | A1 | * | 10/2017 | Koi | G02B 30/56 |
| 2018/0024373 | A1 | | 1/2018 | Joseph et al. | |
| 2018/0259810 | A1 | | 9/2018 | Numata et al. | |
| 2019/0179062 | A1 | | 6/2019 | Nawata et al. | |

FOREIGN PATENT DOCUMENTS

| CN | 102789121 A | 11/2012 | | |
| CN | 103116422 A | 5/2013 | | |
| CN | 203217230 U | 9/2013 | | |
| CN | 103837988 A | 6/2014 | | |
| CN | 104737038 A | 6/2015 | | |
| CN | 104977794 A | 10/2015 | | |
| CN | 105372926 A | 3/2016 | | |
| CN | 205749964 U | 11/2016 | | |
| CN | 103901706 A | 7/2017 | | |
| EP | 2180365 A1 | 4/2010 | | |
| GB | 693922 A | 7/1953 | | |
| JP | H08166561 A | 6/1996 | | |
| JP | H08179312 A | 7/1996 | | |
| JP | H1164816 A | 3/1999 | | |
| JP | H11142896 A | 5/1999 | | |
| JP | 2002323612 A | 11/2002 | | |
| JP | 2003509715 A | 3/2003 | | |
| JP | 2003195788 A | 7/2003 | | |
| JP | 2004317828 A | 11/2004 | | |
| JP | 2008015359 A | 1/2008 | | |
| JP | 2008197309 A | 8/2008 | | |
| JP | 4225042 B2 | 2/2009 | | |
| JP | 2009025776 A | 2/2009 | | |
| JP | 2014186916 A | 10/2014 | | |
| JP | 2015529854 A | 10/2015 | | |
| JP | 2018045183 A | 3/2018 | | |
| JP | 2018092133 A | 6/2018 | | |
| KR | 1020190090854 A | 8/2019 | | |
| WO | 09531739 A1 | 11/1995 | | |
| WO | WO-0065844 A1 | * | 11/2000 | ......... G02B 17/0621 |
| WO | WO-2005059653 A2 | * | 6/2005 | ........... G02B 27/286 |
| WO | 2016088683 A1 | 6/2016 | | |
| WO | 2018043673 A1 | 3/2018 | | |
| WO | WO-2018042830 A1 | * | 3/2018 | ............. G02B 27/22 |

OTHER PUBLICATIONS

Office Action issued in U.S. Appl. No. 15/398,194 dated Aug. 28, 2018.
Office Action issued in U.S. Appl. No. 15/398,194 dated Jun. 10, 2019.
International Search Report and Written Opinion dated Feb. 26, 2018 from State Intellectual Property Office of the P.R. China.
Extended European Search Report from corresponding European Patent Application No. 17879450.9 dated Jun. 26, 2020.
First Japanese Office Action from corresponding Japanese Patent Application No. 2019-552325 dated Jul. 21, 2020.
First Korean Office Action from corresponding Korean Patent Application No. 10-2019-7019572 dated Jul. 16, 2020.
First Korean Office Action from Corresponding Korean Patent Application No. 10-2019-7019630 dated Jul. 16, 2020.
First Japanese Office Action from corresponding Japanese Patent Application No. 2019-552326 dated Jul. 21, 2020.
European Search Report from corresponding European Patent Application No. 17878470.8 dated Jul. 3, 2020.
First Office Action in corresponding Chinese Patent Application No. 201711269267.0 dated Sep. 16, 2020.
Japanese Office Action from Japanese Patent Application No. 2019-552325 dated Dec. 22, 2020.
Office Action issued by the European Patent Office for European Patent Application No. 17879450.9 dated Feb. 18, 2022.
European Search Report from European Application No. 17878470.8 dated Sep. 6, 2021.
Notice of Allowance issued in U.S. Appl. No. 16/017,020 dated Jan. 16, 2020.
First Japanese Office Action from Japanese Patent Application No. 2021-126378 dated Jun. 20, 2022.
First Japanese Office Action from Japanese Patent Application No. 2021-126377 dated Jun. 23, 2022.

* cited by examiner

SYSTEM FOR USE IN IMAGING IN AIR

The present application claims priority of Chinese Patent Application No. CN2016111240031 filed on Dec. 8, 2016, priority of Chinese Patent Application No. CN2017112704019 filed on Dec. 5, 2017, priority of Chinese Patent Application No. CN2017112712706 filed on Dec. 5, 2017, priority of Chinese Patent Application No. CN2017112692670 filed on Dec. 5, 2017 and priority of Chinese Patent Application No. CN2017112712725 filed on Dec. 5, 2017, and these applications are incorporated herein by reference in its entirety.

TECHNICAL FIELD

The present invention relates to the field of holographic imaging, and more particularly, to a system for imaging in air.

BACKGROUND

A holographic technology is a technology of recording and reproducing a real three-dimensional image of an object on principles of interference and diffraction.

In a traditional holographic imaging method, a holographic image is produced on a principle of laser interference. Light emitted by a laser source is split into two beams, of which one beam is directly emitted to a sensitometric strip, and the other beam is reflected by a photographed object and then emitted to the sensitometric strip. The two beams are superimposed on the sensitometric strip to cause interference; and finally, the reproduced hologram is further processed using a basic principle of digital images, to remove digital noise and obtain a clear holographic image. The method has disadvantages of high requirements for monochromaticity and difficulty in implementing color imaging.

Existing holographic imaging technologies are generally classified into three types below.

In a first type, it is necessary to have the aid of virtual reality or augmented reality glasses or helmets, such as Microsoft's HoloLens, etc.; and such type of technology has limited application scenarios and is currently expensive due to the need for auxiliary devices.

In a second type, a high-speed rotating reflective plate and a high-speed refresh projector are required to project an image onto the high-speed rotating reflective plate, so as to achieve a three-dimensional image. A rotary holographic projection show cabinet by using such type of technology is disclosed in a patent document No. CN105372926A. The technology is difficult to realize interaction, and has a strict demand on a site space.

In a third type, with the help of a medium containing fine particles, for example, the air containing water vapor, an image is projected onto a small water droplet formed by liquefaction of the water vapor, so that an image having a strong hierarchical and stereoscopic sense may be formed, due to unbalanced molecular vibration. Application of such type of technology is disclosed in patent documents No. CN104977794A and No. CN 103116422A, in both of which a water vapor curtain wall is used for forming an image in the air. But auxiliary tools for producing the water vapor curtain wall are still required for application of the technology, so it is not very convenient to use.

In general, in the above-described technologies, the image is either formed on a virtual reality or augmented reality tool, or formed on a high-speed rotating reflective plate, or formed on vapor particles in the air, none of which is really imaging in the air.

SUMMARY

The present invention is intended to overcome deficiencies of the above-described technologies, and provide a real system and method for imaging in the air, so that an image may be directly formed in the air without any special medium, and even in a vacuum. The system and method for imaging in the air greatly expands an application range, without being limited by any auxiliary tool, and brings revolutionary breakthrough to existing human-machine interaction scenarios.

A main aspect of the present invention provides a system for imaging in air, comprising: an image source, a transflective mirror and a retroreflective element. Light emitted by the image source is irradiated on the retroreflective element after being reflected by the transflective mirror, the light is reflected by the retroreflective element and emerges in an opposite direction along an original incident path, and then forms a real image after being transmitted by the transflective mirror.

Another main aspect of the present invention provides a system for imaging in air, comprising: an image source, a transflective mirror and a retroreflective element. Light emitted by the image source is irradiated on the retroreflective element after being transmitted by the transflective mirror, the light is reflected by the retroreflective element and emerges in an opposite direction along an original incident path, and then forms a real image after being reflected by the transflective mirror.

A still another main aspect of the present invention provides a system for imaging in air, comprising: an image source, a transflective mirror, a first retroreflective element and a second retroreflective element. Light emitted by the image source is irradiated on the first retroreflective element after being reflected by the transflective mirror, the light is reflected by the first retroreflective element and emerges in an opposite direction along an original incident path, and then forms a first real image after being transmitted by the transflective mirror; and in addition, the light emitted by the image source is irradiated on the second retroreflective element after being transmitted by the transflective mirror, the light is reflected by the second retroreflective element and emerges in an opposite direction along an original incident path, and then forms a second real image after being reflected by the transflective mirror.

A further main aspect of the present invention provides a system for imaging in air, comprising: a first image source, a second image source, a transflective mirror and a retroreflective element. Light emitted by the first image source is irradiated on the retroreflective element after being reflected by the transflective mirror, the light is reflected by the retroreflective element and emerges in an opposite direction along an original incident path, and then forms a first real image after being transmitted by the transflective mirror; while the light emitted by the second image source is irradiated on the retroreflective element after being transmitted by the transflective mirror, the light is reflected by the retroreflective element and emerges in an opposite direction along an original incident path, and then forms a second real image after being reflected by the transflective mirror; and positions of the first image source and the second image source are set such that the first real image and the second real image are formed in a same position.

Preferably, the image source is a display imaging device that emits a virtual image or a real image, or a virtual image or a real image formed by such an imaging device.

Preferably, a light source of the image source is one or more selected from the group consisting of a laser, light emitting diode, an organic light-emitting diode and a stimulated fluorescence luminescence material.

Preferably, a transmittance of the transflective mirror ranges from 20% to 80%.

Preferably, a reflectance of the transflective mirror ranges from 20% to 80%.

In a preferred embodiment, the retroreflective element includes a base material having a reflecting surface and micro-structures distributed on the base material.

Preferably, the micro-structure is a right-angled vertex micro-structure made of a transparent material, the right-angled vertex micro-structure has at least one right-angled vertex, and three edges of the right-angled vertex are at right angles to each other.

Preferably, the micro-structure is a concave portion including the right-angled vertex micro-structure, the right-angled vertex micro-structure has at least one right-angled vertex and the three edges of the right-angled vertex are at right angles to each other.

Preferably, the micro-structure is a spherical micro-structure made of a transparent material.

Preferably, the reflecting surface is formed on a surface of the base material that faces the micro-structure.

Preferably, the reflecting surface is formed on a region where the base material borders the micro-structure.

Preferably, the micro-structure and the base material are integrally formed of a same transparent material, the right-angled vertex is outwardly convex, and the reflecting surface is formed on three faces which are formed by the three edges of the right-angled vertex that intersect with one another in a pairwise manner.

Preferably, the micro-structures are evenly distributed on the base material.

Preferably, the base material is a thin film, a curtain, a sheet or a resin.

In another preferred embodiment, a retroreflective element includes a large number of retroreflective units.

Preferably, the retroreflective unit includes a micro-structure having a reflecting surface.

Preferably, the micro-structure is a right-angled vertex micro-structure made of a transparent material, the right-angled vertex micro-structure has at least one right-angled vertex, three edges of the right-angled vertex are at right angles to one another, and three faces formed by the three edges intersecting with one another in a pairwise manner or at least a portion region thereof form the reflecting surface.

Preferably, the micro-structure is a concave portion having a right-angled vertex micro-structure, the right-angled vertex micro-structure has at least one right-angled vertex, three edges of the right-angled vertex are at right angles to one another, and three faces formed by the three edges intersecting with one another in a pairwise manner or at least a portion region thereof form the reflecting surface.

Preferably, the micro-structure is a spherical micro-structure made of a transparent material; and a surface of a portion of the spherical micro-structure that is farther away from the transflective mirror forms the reflecting surface.

Preferably, the reflecting surface of the micro-structure is attached onto the base material or integrally formed with the base material; the base material can be used for carrying the retroreflective element.

Preferably, a face other than the reflecting surface of the micro-structure is attached onto the transparent base material or integrally formed with the base material; the base material can be used for carrying the retroreflective element.

In still another preferred embodiment, a retroreflective element also includes a large number of retroreflective units.

Preferably, the retroreflective unit includes one of a first material and a second material, and the retroreflective unit further includes a reflecting surface. The first material is a transparent solid material; the first material is located in front of the reflecting surface, as viewed from an incident path of light; the light enters through the first material, is reflected by the reflecting surface, and then exits from the first material; the second material is located behind the reflecting surface, as viewed from the incident path of the light.

Preferably, the retroreflective unit includes the first material and the second material, and the retroreflective unit further includes the reflecting surface; the first material is air or vacuum; and the second material is a thin film, a curtain, a sheet or a resin. The first material is located in front of the reflecting surface, as viewed from the incident path of the light; and the light enters through the first material, is reflected by the reflecting surface, and then exits from the first material. The second material is located behind the reflecting surface, as viewed from the incident path of the light.

Preferably, the reflecting surface includes three faces formed by three edges of a right-angled vertex that intersect with one another in a pairwise manner or at least a portion of region of the three faces. The three edges of the right-angled vertex are at right angles to one another.

Preferably, the reflecting surface is a portion of a sphere surface, and a center of the sphere is located in front of the reflecting surface, as viewed from the incident path of the light.

Preferably, the second material is a thin film, a curtain, a sheet or a resin.

Preferably, the three edges of the right-angled vertex are equal in length.

Preferably, a highly reflective material is attached onto the reflecting surface.

Preferably, reflectance of the highly reflective material is as high as 60%, 70%, 80% or 90%.

Preferably, the highly reflective material is attached onto the reflecting surface by spraying or coating.

Preferably, the retroreflective element has an arc curved toward the transflective mirror.

Preferably, the micro-structures are evenly distributed on the retroreflective element.

Preferably, the image source is a stereo image source.

Preferably, the stereo image source is a three-dimensional stereoscopic display device which can display a three-dimensional image, structure and video source.

Preferably, the three-dimensional stereoscopic display device includes a translational scanning imaging system or a rotational scanning imaging system.

Preferably, one of two faces of the transflective mirror is attached with a transflective material such that reflectance ranges from 20% to 80% and corresponding transmittance ranges from 80% to 20%.

Preferably, one of the two faces of the transflective mirror that is not attached with the transflective material is attached with an anti-reflective material.

Preferably, lengths of the three edges range from 20 micrometers to 5 millimeters.

Preferably, among the three edges, a length of a longest edge does not exceed 10 times of the length of a shortest edge.

Preferably, when the first material is a transparent solid material, its incident surface is attached with an anti-reflective material.

Preferably, when the first material is a transparent solid material, its incident surface is a flat surface.

Preferably, at least one of the three faces formed by the three edges is at an included angle of less than 54 degrees to the incident surface.

A main aspect of the present invention provides a method for imaging in air, comprising the following steps: (1) providing an image source, a transflective mirror and a retroreflective element; (2) allowing light emitted by the image source to irradiate on the retroreflective element after being reflected by the transflective mirror; (3) allowing the light reflected by the retroreflective element to emerge in an opposite direction along an original incident path, and form a real image after being transmitted by the transflective mirror.

Another main aspect of the present invention provides a method for imaging in air, comprising the following steps: (1) providing an image source, a transflective mirror and a retroreflective element; (2) allowing light emitted by the image source to irradiate on the retroreflective element after being transmitted by the transflective mirror; (3) allowing the light reflected by the retroreflective element to emerge in an opposite direction along an original incident path, and then form a real image after being reflected by the transflective mirror.

A still another main aspect of the present invention provides a method for imaging in air, comprising the following steps: (1) providing an image source, a transflective mirror, a first retroreflective element and a second retroreflective element; (2) allowing light emitted by the image source to irradiate on the first retroreflective element after being reflected by the transflective mirror; and allowing light emitted by the image source to irradiate on the second retroreflective element after being transmitted by the transflective mirror, (3) allowing the light reflected by the first retroreflective element to emerge in an opposite direction along an original incident path, and form a first real image after being transmitted by the transflective mirror; and allowing the light reflected by the second retroreflective element to emerge in an opposite direction along an original incident path, and form a second real image after being reflected by the transflective mirror.

A further main aspect of the present invention provides a method for imaging in air, comprising the following steps: (1) providing a first image source, a second image source, a transflective mirror and a retroreflective element; (2) allowing light emitted by the first image source to irradiate on the retroreflective element after being reflected by the transflective mirror; and allowing light emitted by the second image source to irradiate on the retroreflective element after being transmitted by the transflective mirror; (3) allowing the light emitted by the first image source to emerge in an opposite direction along an original incident path after being reflected by the retroreflective element, and form a first real image after being transmitted by the transflective mirror; and allowing the light emitted by the second image source to emerge in an opposite direction along an original incident path after being reflected by the retroreflective element, and form a second real image after being reflected by the transflective mirror; (4) setting positions of the first image source and the second image source such that the first real image and the second real image are formed in a same position.

In the present invention, the meaning of "retroreflection" is that: in a case that light is retroreflected by the retroreflective element, as observed macroscopically, reflected light and incident light are located in a same path, but in opposite directions (of course, as observed microscopically, a reflection path may be considered to be slightly offset from an incident path). In addition, because light has wave-particle duality, when the light is reflected from the retroreflective element, there will be a certain diffraction effect, and the reflected light will have a certain divergence angle; understanding from the perspective, as long as a principal axis of the reflected light has a direction opposite to that of the incident light, requirements of "retroreflection" in the present invention are also satisfied.

Fraunhofer diffraction and Microscopic offset of the light caused by retroreflection are two core factors that affect definition of imaging in the air according to the present invention, and these two factors are also mutually constrained. The smaller the size of the micro-structure of the retroreflective element, the smaller the light offset caused thereby, but the larger the spot caused by diffraction; on the contrary, the larger the size of the micro-structure, the smaller the spot caused by diffraction, but the larger the light offset caused thereby. In order to overcome adverse effects of these two mutually constrained relationships on imaging definition, the present invention further provides solutions below to obtain optimal imaging definition.

A main aspect of the present invention provides a system for imaging in air, comprising: an image source, a transflective mirror and a retroreflective element. Light emitted by the image source is irradiated on the retroreflective element after being reflected by the transflective mirror and, the light is reflected by the retroreflective element and then emerges in an opposite direction along an original incident path, and after being transmitted by the transflective mirror, then forms a real image. The retroreflective element includes a large number of micro-structures for retroreflecting, a relationship among a radius of the micro-structures, a dot pitch of a pixel array of the source image, and an optical path from the real image to the retroreflective element is designed as that a diameter of the micro-structures increases as the dot pitch increases, and the optical path also increases as the dot pitch increases.

Preferably, the relationship among the diameter of the micro-structures, the dot pitch of the pixel array of the source image, and the optical path from the real image to the retroreflective element is designed as that the diameter of the micro-structures has a linear relationship with the dot pitch, and the optical path has a linear relationship with a square of the dot pitch.

Preferably, a relationship between the diameter of the micro-structures and the optical path from the real image to the retroreflective element is designed as that upon the optical path being selected, an area of the micro-structures is designed to be inversely proportional to a wavelength of the light emitted by the image source.

Preferably, a relationship between the diameter of the micro-structures and the dot pitch of the pixel array of the source image is designed as that the diameter of the micro-structures is less than or equal to half of the dot pitch of the pixel array of the source image.

Preferably, a preset observation distance for a user to observe the real image increases as the optical path from the real image to the retroreflective element increases.

Preferably, the preset observation distance for a user to observe the real image has a linear relationship with the optical path from the real image to the retroreflective element.

Preferably, the dot pitch of the pixel array of the source image is selected such that it increases as the preset observation distance for a user to observe the formed real image increases.

Preferably, the dot pitch of the pixel array of the source image is selected such that it is positively proportional to the preset observation distance for a user to observe the formed real image.

Another main aspect of the present invention provides a method for imaging in air using a system including an image source, a transflective mirror and a retroreflective element; the method comprises: allowing light emitted by the image source to be subjected to a reflection of the transflective mirror and be irradiated on the retroreflective element; allowing the light to be reflected by the retroreflective element and then emerge in an opposite direction along an original incident path, and after being transmitted by the transflective mirror, then form a real image. The retroreflective element includes a large number of micro-structures for retroreflecting, and the method further comprises: designing a relationship among a radius of the micro-structures, a dot pitch of a pixel array of the source image, and an optical path from the real image to the retroreflective element as follows: a diameter of the micro-structures increases as the dot pitch increases, and the optical path also increases as the dot pitch increases.

Preferably, the relationship between the diameter of the micro-structures, the dot pitch of the pixel array of the source image, and the optical path from the real image to the retroreflective element is designed as follows: the diameter of the micro-structures has a linear relationship with the dot pitch, and the optical path has a linear relationship with a square of the dot pitch.

Preferably, the relationship between the diameter of the micro-structures and the optical path from the real image to the retroreflective element is designed as that upon the optical path being selected, an area of the micro-structure is designed to be inversely proportional to a wavelength of the light emitted by the image source.

Preferably, the relationship between the diameter of the micro-structures and the dot pitch of the pixel array of the source image is designed as that the diameter of the micro-structures is less than or equal to half of the dot pitch of the pixel array of the source image.

Preferably, a preset observation distance for a user to observe the real image increases as the optical path from the real image to the retroreflective element increases.

Preferably, the preset observation distance for a user to observe the formed real image has a linear relationship with the optical path from the real image to the retroreflective element.

Preferably, the dot pitch of the pixel array of the source image is selected such that it increases as the preset observation distance for a user to observe the formed real image increases.

Preferably, the dot pitch of the pixel array of the source image is selected such that it is positively proportional to the preset observation distance for a user to observe the formed real image.

A still another main aspect of the present invention provides a method for constructing a system for imaging in air, the system comprising an image source, a transflective mirror and a retroreflective element, the retroreflective element including a large number of micro-structures for retroreflecting, and the method comprising: allowing the image source, the transflective mirror and the retroreflective element to form a light path as follows: light emitted by the image source is irradiated on the retroreflective element after being reflected by the transflective mirror and, the light is reflected by the retroreflective element and then emerges in an opposite direction along an original incident path, and after being transmitted by the transflective mirror, then forms a real image; determining an observation distance for a user to observe the formed real image; determining an optical path from the real image to the retroreflective element based on the observation distance, wherein the optical path increases as the observation distance increases; determining a dot pitch of the pixel array of the source image based on the observation distance, wherein the dot pitch increases as the observation distance increases; determining a diameter of the micro-structures based on the dot pitch, wherein the diameter of the micro-structures is less than or equal to half of the dot pitch of the pixel array of the source image.

Preferably, the optical path is positively proportional to the observation distance, and/or the dot pitch is positively proportional to the observation distance.

An effect of light offset on a light spot size does not vary with an imaging distance, but varies linearly with a scale of the micro-structure. Therefore, it can be solved by using a method of reducing the size of a micro-structure unit, for example, ultra-fine processing, etc. While a size of a spot caused by diffraction varies linearly with variation of the imaging distance, so it is a key factor to try to reduce light divergence caused by diffraction.

When a conventional right-angled triangular pyramid structure is used as a retroreflective unit, incident light is refracted by an upper surface, and reflected on the right-angled triangular pyramid of the retroreflective unit after irradiating thereon, and at the same time, due to Fraunhofer diffraction, diverges at a certain angle. Thereafter, the light is refracted by the upper surface of the retroreflective element, to form reflected light having a principal axis whose direction is opposite to that of the incident light, but with a small amount of offset and a certain divergence angle.

In order to minimize the adverse effect of light divergence caused by diffraction on imaging definition, the present invention further provides solutions below to improve imaging definition.

A main aspect of the present invention provides a retroreflective element, including a transparent base and a reflective material attached onto the transparent base. Light reaches the reflective material after entering through the transparent base, and is reflected by the reflective material, and then emerges through the transparent base in an opposite direction along an original incident path. The retroreflective element includes a large number of micro-structures for retroreflecting, each micro-structure includes a convex lens unit and a plurality of right-angled triangular pyramid units, the plurality of right-angled triangular pyramid units are located downstream of the convex lens unit in the incident path, the reflective material is located downstream of the plurality of right-angled triangular pyramid units in the incident path, and attached onto the right-angled triangular pyramid unit; in addition, the plurality of right-angled triangular pyramid units are arranged on a focal plane of the convex lens unit.

Another main aspect of the present invention provides a retroreflective element, including a transparent base and a reflective material attached onto the transparent base. Light reaches the reflective material after entering through the transparent base, and is reflected by the reflective material, and then emerges through the transparent base in an opposite direction along an original incident path. The retroreflective element further includes a convex lens unit array and a right-angled triangular pyramid unit array, the right-angled triangular pyramid unit array is located downstream of the convex lens unit array in the incident path, the reflective material is located downstream of the right-angled triangular pyramid unit array in the incident path, and attached onto the right-angled triangular pyramid unit array. Each convex lens unit covers a plurality of right-angled triangular pyramid units; in addition, the plurality of right-angled triangular pyramid units are arranged on a focal plane of the convex lens unit.

Preferably, an anti-reflective material is attached onto a surface of the convex lens unit, such that its surface transmittance is greater than 0.7, 0.8 or 0.9.

Preferably, reflectance of the reflective material is greater than 0.5, 0.6, 0.7, 0.8 or 0.9.

Preferably, a diameter of the convex lens unit is about 50 times of a side length of the right-angled triangular pyramid unit.

Preferably, the diameter of the convex lens unit is less than or equal to 1 mm.

Preferably, the side length of the right-angled triangular pyramid unit is less than or equal to 0.02 mm.

A still another main aspect of the present invention provides a system for imaging in air, comprising: an image source, a transflective mirror, and the above-described retroreflective element. Light emitted by the image source is irradiated on the retroreflective element after being reflected by the transflective mirror, the light is reflected by the retroreflective element and then emerges in an opposite direction along an original incident path, and then forms a real image after being transmitted by the transflective mirror.

A further main aspect of the present invention provides a system for imaging in air, comprising: an image source, a transflective mirror, and the above-described retroreflective element. Light emitted by the image source is irradiated on the retroreflective element after being transmitted the transflective mirror, the light is reflected by the retroreflective element and then emerges in an opposite direction along an original incident path, and then forms a real image after being reflected by the transflective mirror.

A still another main aspect of the present invention provides a system for imaging in air, comprising: an image source, a transflective mirror, a first retroreflective element and a second retroreflective element, the first retroreflective element and the second retroreflective element being respectively formed by the above-described retroreflective element. Light emitted by the image source is irradiated on the first retroreflective element after being reflected by the transflective mirror, the light is reflected by the first retroreflective element and then emerges in an opposite direction along an original incident path, and then forms a first real image after being transmitted by the transflective mirror; while in addition, the light emitted by the image source is irradiated on the second retroreflective element after being transmitted by the transflective mirror, the light is reflected by the second retroreflective element and then emerges in an opposite direction along an original incident path, and then forms a second real image after being reflected by the transflective mirror.

According to the above-described system for imaging in the air in the present invention, it is necessary for the light emitted by the image source to pass through a reflection and a transmission (regardless of order) of the transflective mirror, as well as a reflection of the retroreflective element, so as to form an image; and thus, luminance of the formed real image is approximately equal to a product of luminance of the light emitted by the image source, reflectance and transmittance of the transflective mirror, and a reflection luminous efficacy of the retroreflective element. That is, an approximate calculation formula of final imaging luminance L is:

$$L = L_0 \times T_g \times R_g \times \eta$$

$L_0$ is the luminance of the image source, $T_g$ and $R_g$ are respectively the transmittance and the reflectance of the transflective mirror, and $\eta$ is the reflection luminous efficacy of the retroreflective element.

With respect to a conventional transflective mirror, a sum of reflectance and transmittance should be 100% regardless of absorption of light energy by the base material, that is, there is an approximate relationship as follows:

$$T_g = (1 - R_g)$$

Then $T_g \times R_g = (1 - R_g) \times R_g \leq 25\%$

It can be seen that, a luminous efficacy of the transflective mirror is less than or equal to ¼, which is relatively low.

Based on this, the present invention further provides a technology for improving the luminous efficacy and enhancing the imaging luminance, as well as a corresponding device for imaging in the air.

A main aspect of the present invention provides a system for imaging in air, comprising: an image source, a transflective mirror and a retroreflective element. Light emitted by the image source is irradiated on the retroreflective element after being reflected by the transflective mirror, the light is reflected by the retroreflective element and then emerges in an opposite direction along an original incident path, and then forms a real image after being transmitted by the transflective mirror. The image source is an s-polarized light source; a selective transmissive film is plated on a side of the transflective mirror that faces the image source, and the selective transmissive film is set to have higher reflectance with respect to s-polarized light, and higher transmittance with respect to p-polarized light. A phase delay optical element is provided on a side of the retroreflective element that faces the transflective mirror such that light of the s-polarized light source emitted from the transflective mirror to the retroreflective element becomes circularly polarized light after passing through the phase delay optical element.

Preferably, a component of the selective transmissive film includes one of a metal oxide, a metal nitride, a metal oxynitride coating film and an organic polymer.

Preferably, the selective transmissive film includes one or more film layers, and a component of each film layer includes one of a metal oxide, a metal nitride, a metal oxynitride coating film, and an organic polymer.

Preferably, the light emitted by the image source is selected to be s-polarized light of a specific wavelength band, and the selective transmissive film is set to have higher reflectance with respect to the s-polarized light of the specific wavelength band, and higher transmittance with respect to s-polarized light of other wavelength band and p-polarized light within a visible light band.

Preferably, average reflectance of the selective transmissive film with respect to the s-polarized light is greater than 70%, 80% or 90%.

Preferably, average transmittance of the selective transmissive film with respect to the p-polarized light is greater than 70%, 80% or 90%.

Preferably, the phase delay optical element is a ¼ wave plate.

Preferably, an anti-reflective film is attached to a side of the transflective mirror that faces away from the image source.

Another main aspect of the present invention provides a system for imaging in air, comprising: an image source, a transflective mirror and a retroreflective element.

Light emitted by the image source is irradiated on the retroreflective element after being transmitted by the transflective mirror, the light is reflected by the retroreflective element and emerges in an opposite direction along an original incident path, and then forms a real image after being reflected by the transflective mirror.

The image source is a p-polarized light source; a selective transmissive film is plated on a side of the transflective mirror that faces the image source, and the selective transmissive film is set to have higher reflectance with respect to s-polarized light, and higher transmittance with respect to p-polarized light. A phase delay optical element is provided on a side of the retroreflective element that faces the transflective mirror such that light of the p-polarized light source emitted from the transflective mirror to the retroreflective element becomes circularly polarized light after passing through the phase delay optical element.

It is found by further research that, a reflection luminous efficacy of the retroreflective element is not only related to reflectance of a reflecting surface, but also related to factors such as an angle of light incident on a retroreflective unit, and a shape and a structure of the retroreflective unit.

A straight line at equal included angles (each of which is about 54.7°) to all three edges of the retroreflective unit is defined as a center line; and it is found by research that, incident light at a smaller included angle to the center line has a higher reflection luminous efficacy; contrariwise, incident light at a larger included angle to the center line has a lower reflection luminous efficacy.

Based on the analysis of imaging luminance and imaging definition, in order to improve luminance and definition of imaging in the air, a structural design is proposed that the retroreflective element is divided into a plurality of small pieces, which are discretely distributed on one side of the transflective mirror according to a certain rule.

Based on this, the present invention further provides a system for imaging in air, comprising: an image source, a transflective mirror and a retroreflective element.

Light emitted by the image source is irradiated on the retroreflective element after being reflected by the transflective mirror, the light is reflected by the retroreflective element and then emerges in an opposite direction along an original incident path, and after being transmitted by the transflective mirror, then forms a real image; the retroreflective element is formed by an array including a plurality of retroreflective sub-elements; each of the retroreflective sub-elements includes a substantially planar base material, and a large number of retroreflective units having a reflecting surface are distributed on the base material; the retroreflective unit has a right-angled vertex micro-structure, the right-angled vertex micro-structure has at least one right-angled vertex, three edges of the right-angled vertex are at right angles to one another; and an included angle between a center line of the right-angled vertex micro-structure and a normal of the base material plane is less than 15 degrees, the center line is at equal included angles to all of the three edges of the right-angled vertex micro-structure.

There is a complete real image vision domain where the real image is completely visible as viewed from a side view of the system, the complete real image vision domain has two vision domain boundaries whose intersection point is a vision domain point; the array includes an array first end closer to the transflective mirror and an array second end farther away from the transflective mirror; reverse extension lines of the vision domain boundaries intersect with the transflective mirror at a transflective mirror first point closer to the array first end and a transflective mirror second point farther away from the array first end; light emitted by the image source has an effective exposure region located between the image source and the transflective mirror, the effective exposure region includes a first boundary and a second boundary, the first boundary is a connection line at a largest included angle to the transflective mirror among connection lines from the transflective mirror first point to respective light-emitting points of the image source, while the second boundary is a connection line at a smallest included angle to the transflective mirror among connection lines from the transflective mirror second point to the respective light-emitting points of the image source.

Moreover, the array of the retroreflective sub-elements is arranged such that the retroreflective sub-elements do not shield the light of the image source that is incident on the transflective mirror, and reverse extension lines of all light rays forming the real image can fall on a certain retroreflective sub-element.

Preferably, as viewed from the side view of the system, each of the retroreflective sub-elements includes a sub-element first end and a sub-element second end. Each sub-element first end falls on the first boundary or falls outside the effective exposure region, while each sub-element second end falls outside the effective exposure region.

Preferably, as viewed from the side view of the system, each of the retroreflective sub-elements includes a sub-element first end and a sub-element second end. Each sub-element first end falls on the first boundary, and an included angle formed by a connection line from a geometric center of a retroreflective sub-element to the vision domain point and a center line of the right-angled vertex micro-structure on the retroreflective sub-element is less than 15 degrees.

Preferably, as viewed from the side view of the system, each of the retroreflective sub-elements includes a sub-element first end and a sub-element second end. Each sub-element first end falls on the first boundary, and an included angle between a connection line from a geometric center of a retroreflective sub-element to the vision domain point and the center line is 0 degree.

Preferably, as viewed from the side view of the system, all the retroreflective sub-elements of the array are sequenced in a short-to-long order of a distance to the transflective mirror first point; a position of a retroreflective sub-element having a shortest distance to the transflective mirror first point is defined as the foremost, and a position of a retroreflective sub-element having a longest distance to the transflective mirror first point is defined as the last. In adjacent two retroreflective sub-elements, a sub-element second end of the former retroreflective sub-element and a sub-element first end of the latter retroreflective sub-element are arranged such that an intersection point of a connection line from the former to the vision domain point and the first boundary is located behind, or overlaps with, an intersection point of a connection line from the latter to the vision domain point and the first boundary.

Preferably, an included angle between the center line of the right-angled vertex micro-structure and the normal of the base material plane is less than 10 degrees or less than 5 degrees.

Preferably, the included angle between the center line of the right-angled vertex micro-structure and the normal of the base material plane is 0 degree, and the three edges of the right-angled vertex micro-structure are equal in length.

In addition, the present invention further provides a system for imaging in the air, comprising: an image source, a transflective mirror and a retroreflective element.

Light emitted by the image source is irradiated on the retroreflective element after being transmitted by the transflective mirror, the light is reflected by the retroreflective element and then emerges in an opposite direction along an original incident path, and then forms a real image after being reflected by the transflective mirror.

The retroreflective element is formed by an array including a plurality of retroreflective sub-elements; each of the retroreflective sub-elements includes a substantially planar base material, and a large number of retroreflective units having a reflecting surface distributed on the base material; the retroreflective unit is a right-angled vertex micro-structure, the right-angled vertex micro-structure has at least one right-angled vertex, three edges of the right-angled vertex are at right angles to one another; and an included angle between a center line of the right-angled vertex micro-structure and a normal of the base material plane is less than 15 degrees, the center line is at equal included angles to all of the three edges of the right-angled vertex micro-structure.

There is a complete real image vision domain where the real image is completely visible as viewed from a side view of the system, the complete real image vision domain has two vision domain boundaries whose intersection point is a vision domain point; the array includes an array first end closer to the transflective mirror and an array second end farther away from the transflective mirror; reverse extension lines of the vision domain boundaries intersect with the transflective mirror at a transflective mirror first point closer to the array first end and a transflective mirror second point farther away from the array first end; light emitted by the image source has an effective exposure region located between the image source and the transflective mirror, the effective exposure region includes a first boundary and a second boundary, the first boundary is a connection line at a largest included angle to the transflective mirror among connection lines from the transflective mirror first point to respective light-emitting points of the image source, while the second boundary is a connection line at a smallest included angle to the transflective mirror among connection lines from the transflective mirror second point to the respective light-emitting points of the image source; a third boundary is defined as a line that is mirror-symmetrical to the first boundary with respect to the transflective mirror, an effective imaging region is defined as a region that is mirror-symmetrical to the effective exposure region with respect to the transflective mirror, and a virtual vision domain point is defined as a point that is mirror-symmetrical to the vision domain point with respect to the transflective mirror.

Moreover, the array of the retroreflective sub-elements is arranged such that the retroreflective sub-elements do not shield light emitted from the transflective mirror to the real image, and reverse extension lines of all incident light rays on the transflective mirror that are emitted from the transflective mirror to the real image can fall on a certain retroreflective sub-element.

Preferably, as viewed from the side view of the system, each of the retroreflective sub-elements includes a sub-element first end and a sub-element second end. Each sub-element first end falls on the third boundary or falls outside the effective imaging region, while each sub-element second end falls outside the effective imaging region.

Preferably, as viewed from the side view of the system, each of the retroreflective sub-elements includes a sub-element first end and a sub-element second end. Each sub-element first end falls on the third boundary, and an included angle formed by a connection line from a geometric center of a retroreflective sub-element to the virtual vision domain point and the center line is less than 15 degrees.

Preferably, as viewed from the side view of the system, each of the retroreflective sub-elements includes a sub-element first end and a sub-element second end. Each sub-element first end falls on the third boundary, and an included angle between a connection line from a geometric center of a retroreflective sub-element to the virtual vision domain point and the center line is 0 degree.

Preferably, as viewed from the side view of the system, all the retroreflective sub-elements of the array are sequenced in a short-to-long order of a distance to the transflective mirror first point; a position of a retroreflective sub-element having a shortest distance to the transflective mirror first point is defined as a foremost, and a position of a retroreflective sub-element having a longest distance to the transflective mirror first point is defined as a last. In adjacent two retroreflective sub-elements, a sub-element second end of the former retroreflective sub-element and a sub-element first end of the latter retroreflective sub-element are arranged such that an intersection point of a connection line from the former to the virtual vision domain point and the third boundary is located behind, or overlaps with, an intersection point of a connection line from the latter to the virtual vision domain point and the third boundary.

The present invention further provides a system for imaging in air, comprising: an image source, a transflective mirror and a retroreflective element.

Light emitted by the image source is irradiated on the retroreflective element after being reflected by the transflective mirror, the light is reflected by the retroreflective element and then emerges in an opposite direction along an original incident path, and then forms a real image after being transmitted by the transflective mirror.

The retroreflective element is formed by an array including a plurality of retroreflective sub-elements; each of the retroreflective sub-elements includes a substantially planar base material, and a large number of retroreflective units having a reflecting surface distributed on the base material; the retroreflective unit has a right-angled vertex micro-structure, the right-angled vertex micro-structure has at least one right-angled vertex, three edges of the right-angled vertex are at right angles to one another; and an included angle between a center line of the right-angled vertex micro-structure and a normal of the base material plane is less than 15 degrees. The center line is at equal included angles to all the three edges of the right-angled vertex micro-structure.

There is a complete real image vision domain where the real image is completely visible as viewed from a side view of the system, the complete real image vision domain has two vision domain boundaries whose intersection point is a vision domain point; and each included angle between a connection line from a geometric center of each of the retroreflective sub-elements to the vision domain point and a center line of the right-angled vertex micro-structure on the retroreflective sub-element is less than 15 degrees.

Preferably, each included angle between a connection line from a geometric center of each of the retroreflective sub-elements to the vision domain point and the center line is 0 degree.

Preferably, the array of the retroreflective sub-elements is arranged such that the retroreflective sub-elements do not shield light of the image source that is incident on the transflective mirror, and/or, reverse extension lines of all light rays forming the real image can fall on a certain retroreflective sub-element.

Preferably, as viewed from the side view of the system, the array includes an array first end closer to the transflective mirror and an array second end farther away from the transflective mirror; reverse extension lines of the vision domain boundaries intersect with the transflective mirror at a transflective mirror first point closer to the array first end and a transflective mirror second point farther away from the array first end. Light emitted by the image source has an effective exposure region located between the image source and the transflective mirror, the effective exposure region includes a first boundary and a second boundary, the first boundary is a connection line at a largest included angle to the transflective mirror among connection lines from the transflective mirror first point to respective light-emitting points of the image source, while the second boundary is a connection line at a smallest included angle to the transflective mirror among connection lines from the transflective mirror second point to the respective light-emitting points of the image source. Each of the retroreflective sub-elements includes a sub-element first end and a sub-element second end; each sub-element first end falls on the first boundary or falls outside the effective exposure region, while each sub-element second end falls outside the effective exposure region.

Preferably, as viewed from the side view of the system, all the retroreflective sub-elements of the array are sequenced in a short-to-long order of a distance to the transflective mirror first point; a position of a retroreflective sub-element having a shortest distance to the transflective mirror first point is defined as the foremost, and a retroreflective sub-element having a longest distance to the transflective mirror first point is defined as the last. In adjacent two retroreflective sub-elements, a sub-element second end of the former retroreflective sub-element and a sub-element first end of the latter retroreflective sub-element are arranged such that an intersection point of a connection line from the former to the vision domain point and the first boundary is located behind, or overlaps with, an intersection point of a connection line from the latter to the vision domain point and the first boundary.

Preferably, an included angle between the center line of the right-angled vertex micro-structure and the normal of the base material plane is less than 10 degrees or less than 5 degrees.

Preferably, the included angle between the center line of the right-angled vertex micro-structure and the normal of the base material plane is 0 degree, and the three edges of the right-angled vertex micro-structure are equal in length.

The present invention further provides a system for imaging in air, comprising: an image source, a transflective mirror and a retroreflective element.

Light emitted by the image source is irradiated on the retroreflective element after being transmitted by the transflective mirror, the light is reflected by the retroreflective element and then emerges in an opposite direction along an original incident path, and then forms a real image after being reflected by the transflective mirror.

The retroreflective element is formed by an array including a plurality of retroreflective sub-elements; each of the retroreflective sub-elements includes a substantially planar base material, and a large number of retroreflective units having a reflecting surface distributed on the base material. The retroreflective unit has a right-angled vertex micro-structure, the right-angled vertex micro-structure has at least one right-angled vertex, three edges of the right-angled vertex are at right angles to one another; and an included angle between a center line of the right-angled vertex micro-structure and a normal of the base material plane is less than 15 degrees. The center line is at equal included angles to all the three edges of the right-angled vertex micro-structure.

There is a complete real image vision domain where the real image is completely visible as viewed from a side view of the system, the complete real image vision domain has two vision domain boundaries whose intersection point is a vision domain point. A virtual vision domain point is defined as a point that is mirror-symmetrical to the vision domain point with respect to the transflective mirror, and each included angle between a connection line from a geometric center of each of the retroreflective sub-elements to the virtual vision domain point and the center line is less than 15 degrees.

Preferably, each included angle between a connection line from a geometric center of each of the retroreflective sub-elements to the virtual vision domain point and the center line is 0 degree.

Preferably, the array of the retroreflective sub-elements is arranged such that the retroreflective sub-elements do not shield light emitted from the transflective mirror to the real image, and/or, reverse extension lines of all incident light rays on the transflective mirror that are emitted from the transflective mirror to the real image can fall on a certain retroreflective sub-element.

Preferably, as viewed from the side view of the system, the array includes an array first end closer to the transflective mirror and an array second end farther away from the transflective mirror; reverse extension lines of the vision domain boundaries intersect with the transflective mirror at a transflective mirror first point closer to the array first end and a transflective mirror second point farther away from the array first end; light emitted by the image source has an effective exposure region located between the image source and the transflective mirror, the effective exposure region includes a first boundary and a second boundary, wherein the first boundary is a connection line at a largest included angle to the transflective mirror among connection lines from the transflective mirror first point to respective light-emitting points of the image source, while the second boundary is a connection line at a smallest included angle to the transflective mirror among connection lines from the transflective mirror second point to the respective light-emitting points of the image source; a third boundary is defined as a line that is mirror-symmetrical to the first boundary with respect to the transflective mirror, and an effective imaging region is defined as a region that is mirror-symmetrical to the effective exposure region with respect to the transflective mirror; each of the retroreflective sub-elements includes a sub-element first end and a sub-element second end; each sub-element first end falls on the third boundary or falls outside the effective imaging region, while each sub-element second end falls outside the effective imaging region.

Preferably, as viewed from the side view of the system, all the retroreflective sub-elements of the array are sequenced in a short-to-long order of a distance to the transflective mirror first point; a position of a retroreflective sub-element having a shortest distance to the transflective mirror first point is defined as the foremost, and a position of a retroreflective sub-element having a longest distance to the transflective mirror first point is defined as the last. In adjacent two retroreflective sub-elements, a sub-element second end of the former retroreflective sub-element and a sub-element first end of the latter retroreflective sub-element are arranged such that an intersection point of a connection line from the former to the virtual vision domain point and the third boundary is located behind, or overlaps with, an intersection point of a connection line from the latter to the virtual vision domain point and the third boundary.

Due to a discrete arrangement mode, it is favorable for reducing an included angle between incident light and the center line of the retroreflective unit with respect to the respective retroreflective sub-elements; the smaller the included angle, the higher the imaging luminance. Furthermore, it is also favorable for shortening an optical path from each of the retroreflective sub-elements to the real image; and the shorter the optical path, the higher the imaging definition.

It should be understood that, although a plurality of preferred features are respectively described above in the respective main aspects, these preferred features are not only intended to be used only in the main aspects, but may also be used in other main aspects in appropriate situations; unless otherwise explained specifically, these features can be used individually or in combination.

In the present invention, a virtual image is changed into a real image, through pioneering use of, for example, the combination of a retroreflective film and a transflective mirror surface, so that imaging in the air is implemented. Advantages of the present invention are as follows: an image can be directly presented in the air or even in vacuum without any medium (for example, a screen, a gas containing fine particles, or a liquid, etc.); and a plurality of people can view the image simultaneously without a helmet, glasses, and other auxiliary devices; in addition, the image is floating in the air and can be touched directly by hand, so a lot of interactive applications can be derived.

BRIEF DESCRIPTION OF THE DRAWINGS

In order to clearly illustrate the technical solution of the embodiments of the present invention or the prior art, the drawings used in description of the embodiments or the prior art will be briefly introduced in the following. It is obvious that the described drawings are just a part of the embodiments of the present invention. These drawings are merely exemplary and not limitative with respect to the present invention.

DETAILED DESCRIPTION

In order to make objects, technical details and advantages of the present invention apparent, hereinafter, the present invention will be further described in detail in connection with the drawings.

For concise and intuitive descriptions, technical solutions of the present invention are described below using representative embodiments. A large quantity of details in the embodiments is merely used for helping understand the solutions of the present invention. However, apparently, when being implemented, technical solutions of the present invention may not be limited to these details. To avoid unnecessarily blurring the solutions of the present invention, some embodiments are not described in great detail, only with frames provided. In the following text, the term "include" refers to "include but is not limited to", and the term "according to . . . " refers to "according to at least . . . , but not being limited only to according to . . . ". "First", "second", etc. are used merely for referring to a feature, and are not intended to impose any limitation on the feature, for example, a limitation in the order. Due to Chinese language habits, when a quantity of components is not particularly pointed out, this means that there may be one or more components, or may be understood as at least one component.

Figure 1:
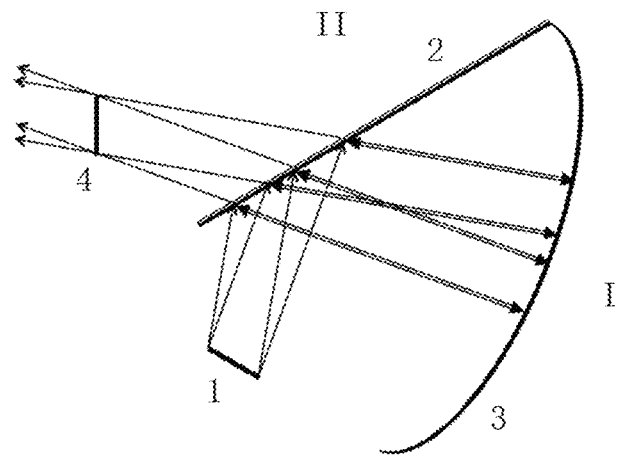
FIG. 1 schematically shows an imaging system according to an embodiment of the present invention.

FIG. 1 shows an imaging system according to an embodiment of the present invention. As shown in the diagram, the system comprises an image source 1, a transflective mirror 2 and a retroreflective element 3. A plane where the transflective mirror 2 is located divides space into a first half region I and a second half region II, and both the image source 1 and the retroreflective element 3 are located in the first half region I.

Light emitted by the image source 1 is irradiated on the retroreflective element 3 after being reflected by the transflective mirror 2, and then the light is retroreflected by the retroreflective element 3, so that reflected light and incident light on the retroreflective element 3 are located in the same path, but in opposite directions. Therefore, the light is reflected by the retroreflective element 3 and then emerges along an original incident path (of course, as observed microscopically, a reflection path may be considered to be slightly offset from an incident path; however, as observed macroscopically, the two paths may be considered to coincide completely), and after being transmitted by the transflective mirror, then forms a real image 4 in the second half region II.

The image source 1 may be a display imaging device, or may also be a virtual image or a real image formed by such a display imaging device.

For example, the display imaging device may be a liquid crystal screen, and a backlight source of the liquid crystal screen includes one or more selected from the group consisting of a laser, light emitting diode, an organic light-emitting diode, an stimulated fluorescence luminescence material and a quantum dot excitation light source; the display imaging device may also be an active luminous dot matrix screen composed of light-emitting point light source such as an LED, an OLED and a plasma light-emitting point; the display imaging device may also be a projection imaging system based on a projection technology, for example, DLP, LCOS and LCD, etc., which, as driven by light source such as an LED, an OLED, a laser, a fluorescent, or a combination thereof, causes light to be reflected or transmitted by a DMD, an LCOS and an LCD, etc., and then projected by a projection lens on a projection screen to form an image; or the display imaging device may also be a projection imaging system in which a laser beam scans on a screen to form an image. Moreover, with respect to all the above-described display imaging devices, a real image or a virtual image formed by a single or multiple refractions or reflections may also be used as an image source.

In a preferred embodiment, the image source 1 may be a stereo image source. The stereo image source includes a three-dimensional stereoscopic display device which can display a three-dimensional stereo image, structure and video source. The three-dimensional stereoscopic display device usually includes a control module and a high-speed projection module or a high-speed display module. The control module controls the projection module or the display module to project or display a series of two-dimensional image slices onto a plurality of optical flats at a high speed, so that an observer observes a three-dimensional image, structure or video. The three-dimensional stereoscopic display device includes a translational scanning imaging system or a rotational scanning imaging system, ect.

The transflective mirror may be made of various suitable transparent materials, for example, a PC resin, a PET resin, a PMMA resin, glass, quartz, and the like. Transmittance of the transflective mirror ranges from 20% to 80%; preferably, is about 50%. Reflectance of the transflective mirror also ranges from 20% to 80%; preferably, is also about 50%.

The retroreflective element 3 is preferably a thin film, a curtain, a sheet or a resin which has micro-structures distributed thereon. The retroreflective element 3 preferably has a certain curvature and is curved toward the transflective mirror, so as to increase imaging luminance. The retroreflective element 3 will be described in detail below.

Figure 2:
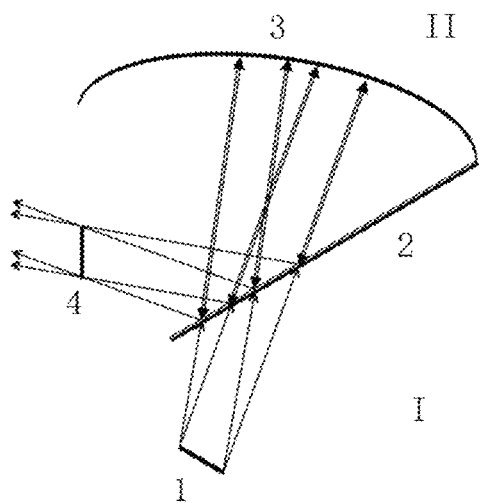
FIG. 2 schematically shows an imaging system according to another embodiment of the present invention.

With reference to FIG. 2, in another embodiment of the present invention, a system comprises an image source 1, a transflective mirror 2 and a retroreflective element 3. A plane where the transflective mirror 2 is located divides space into a first half region I and a second half region II, the image source 1 is located in the first half region I, and the retroreflective element 3 is located in the second half region II.

Light emitted by the image source 1 is irradiated on the retroreflective element 3 after being transmitted by the transflective mirror 2, and then the light is reflected by the retroreflective element 3, so that reflected light and incident light on the retroreflective element 3 are located in the same path, but in opposite directions. Therefore, the light is reflected by the retroreflective element 3 and then emerges along an original incident path, and then forms a real image 4 in the second half region II after being reflected by the transflective mirror.

Of course, it should be understood that, because the light has wave-particle duality, when the light is reflected from the retroreflective element 3, there will be a certain diffraction effect, and the reflected light will have a certain divergence angle; understanding from the perspective, as long as a principal axis of the reflected light has a direction opposite to that of the incident light, the meaning of "retroreflection" in the present invention is also satisfied.

In this embodiment, the light emitted by the image source 1 is transmitted (rather than reflected) by the transflective mirror 2 and then reaches the retroreflective element 3. While the light reflected by the retroreflective element 3 is further reflected (rather than transmitted) by the transflective mirror 2, and then forms the real image 4. The finally formed real image 4 and the retroreflective element 3 are located in the same half region, rather than different half regions.

In still another embodiment of the present invention (not shown), the above-described two embodiments are combined. Two retroreflective elements are used, such that light emitted by an image source is reflected by a transflective mirror and then reaches one of the retroreflective elements, while the light reflected by the retroreflective element is further transmitted by the transflective mirror, and then forms a real image; and the light emitted by the image source is transmitted by the transflective mirror and then reaches the other retroreflective element, while the light reflected by the other retroreflective element further is reflected by the transflective mirror, and then forms a real image. In this way, the two real images generated completely overlap with each other, resulting in imaging of stronger luminance.

Of course, it should be understood that, in other embodiments, additionally or alternatively, two image sources may be used. At this time, it is necessary to adjust positions of the two image sources as well as a transflective mirror and a retroreflective element, so that the finally formed real images completely overlap with each other in space.

The retroreflective element in the present invention is a specially treated element, which includes, for example, a base material coated with a highly reflective coating, and, for example, retroreflective micro-structures evenly distributed on the base material. Reflectance of the highly reflective coating is as high as 60%, preferably, as high as 70%, 80% or 90%. It should be understood that, the highly reflective coating may also be attached onto the base material in other modes, for example, plating.

Of course, the highly reflective coating may be attached, for example, onto a face of the micro-structure that faces the base material, or onto a region where the micro-structure borders the base material.

It should be understood that, distribution of the retroreflective micro-structures on the base material may also be uneven, even distribution may achieve a better imaging effect; however, some deliberately arranged uneven distributions may be used for special imaging purposes.

Figure 3:
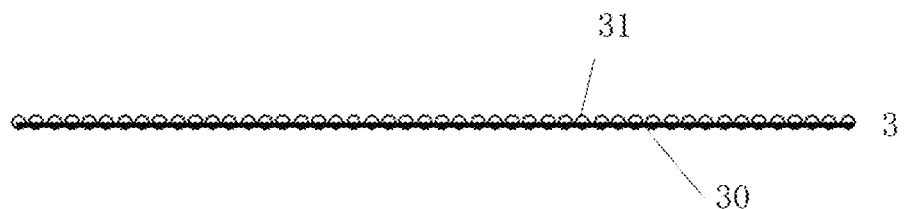
FIG. 3 schematically shows a retroreflective element according to an embodiment of the present invention.

With reference to FIG. 3, a retroreflective element according to one embodiment of the present invention is shown. The retroreflective element 3 includes a thin film or a curtain used as a base material 30. The base material 30 is coated with a highly reflective coating. Further, spherical micro-structures 31 are evenly distributed on the base material 30.

Figure 4:
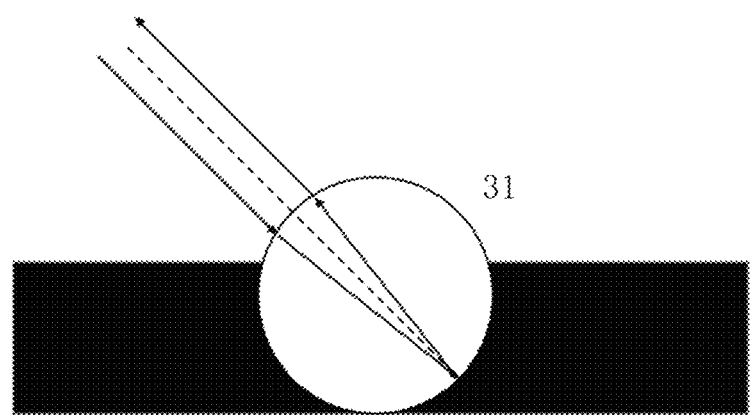
FIG. 4 schematically shows a schematic diagram of a micro-structure of a retroreflective element and a retroreflection path according to an embodiment of the present invention.

With reference to FIG. 4, an enlarged view of the spherical micro-structure and a schematic diagram of a retroreflection path are shown.

Light from a transflective mirror is refracted by an upper surface of the spherical micro-structure 31, and then is irradiated on the highly reflective coating of the base material 30; after being reflected, the light is emitted back to the upper surface of the spherical micro-structure 31; and after being subjected to another refraction, the light is emitted to the transflective mirror. The structure of the spherical micro-structure 31 allows the light to return to the transflective mirror almost along the original path (as described above, as observed macroscopically, it may be considered that the light returns along the original path).

Figure 5:
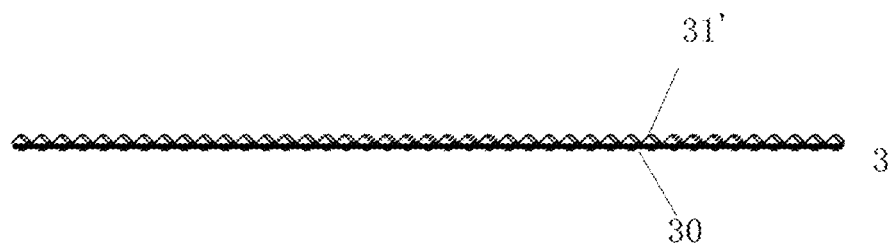
FIG. 5 schematically shows a retroreflective element according to another embodiment of the present invention.

With reference to FIG. 5, a retroreflective element according to another embodiment of the present invention is shown. A base material 30 of the retroreflective element 3 further has right-angled vertex micro-structures 31' evenly distributed thereon. The right-angled vertex micro-structure 31' may be a transparent micro-structure body having at least one vertex whose three edges are at right angles to one another, that is embedded in the base material 30, for example, a micro-cube or a micro-cuboid, or a portion of at least one vertex thereof. The at least one vertex is definitely embedded in the base material 30 (with reference to FIG. 6A). In some embodiments, a right-angled vertex micro-structure 31' is a micro-triangular pyramid whose three edges are at right angles to one another, and a vertex is embedded in the base material 30 (with reference to FIG. 6B); preferably, a bottom face opposite to the vertex is flush with the base material 30; and more preferably, an anti-reflective film is attached onto the bottom face. In a more preferred embodiment, an included angle between at least one face of the three faces formed by the three edges and the bottom face is less than 54 degrees.

It should be understood that, the three edges may be equal in length, or may also be unequal in length. A length of the edge may be selected between 20 micrometers and 5 millimeters. Preferably, among the three edges, a length of a longest edge does not exceed 10 times of the length of a shortest edge.

It should be further understood that, the three faces formed by the three edges should also be perpendicular to one another, that is, a dihedral angle between any two of the three faces should be 90 degrees. However, due to constraints of a process, even if these dihedral angles are not exactly 90 degrees, they can also satisfy requirements of the present invention as long as their errors are within an allowable error range for machining, for example, ±2 minutes.

Figure 6A:
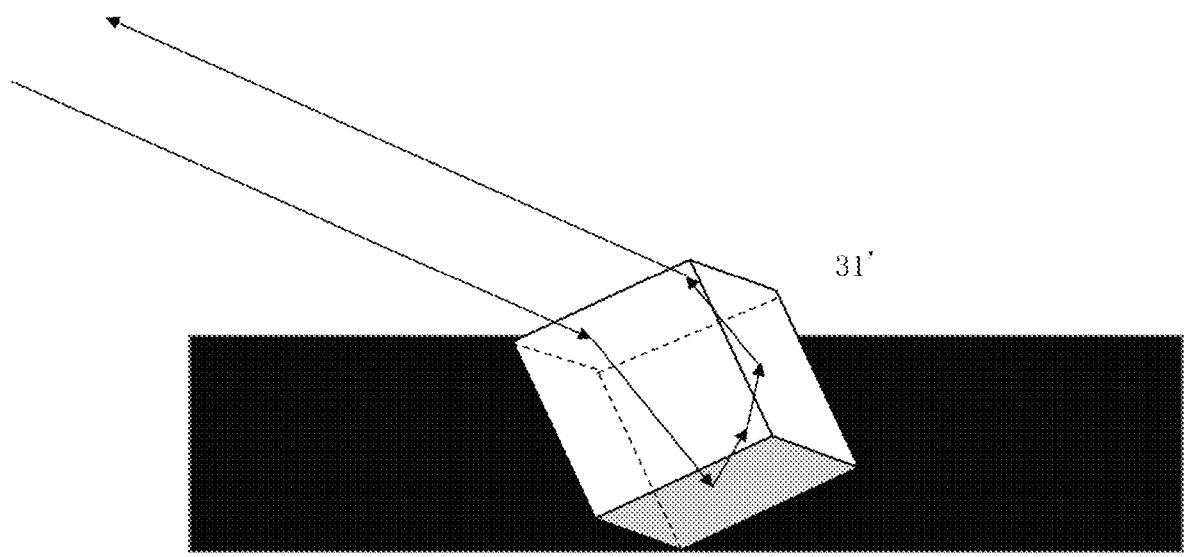
FIG. 6A, FIG. 6B and FIG. 6C schematically show schematic diagrams of a micro-structure of a retroreflective element and a retroreflection path according to another embodiment of the present invention.
Figure 6B:
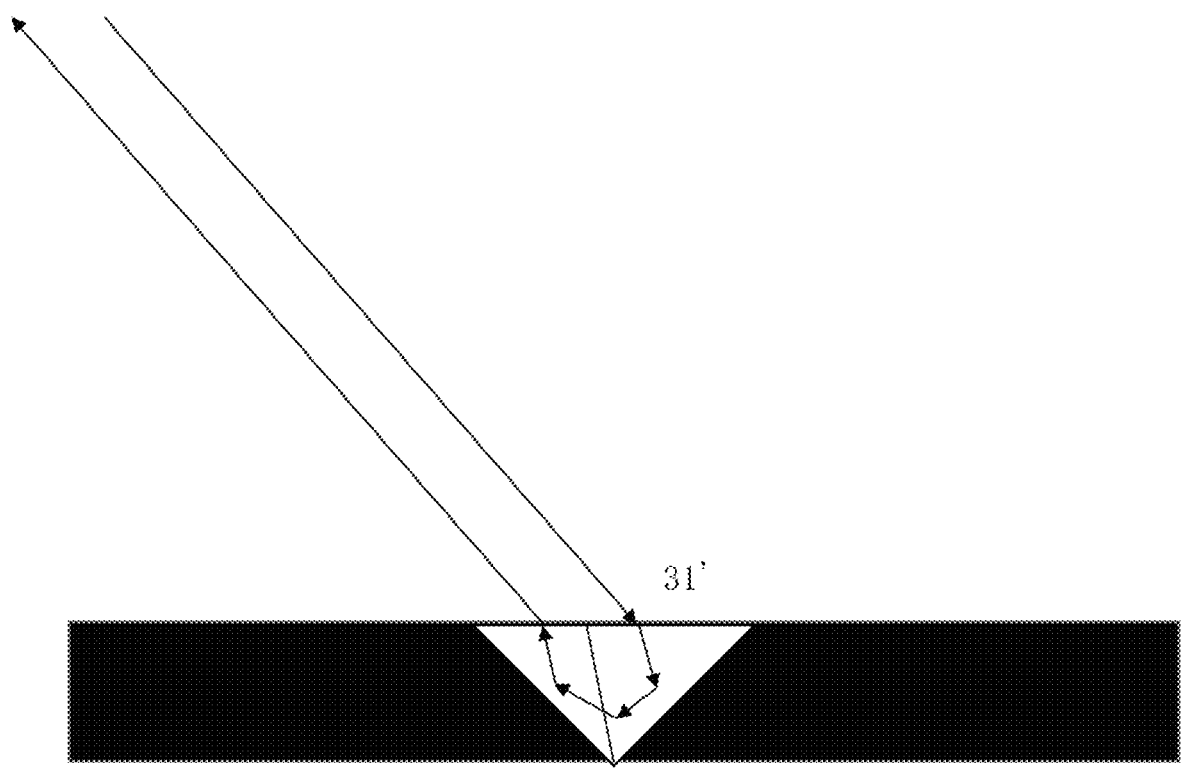
Figure 6C:
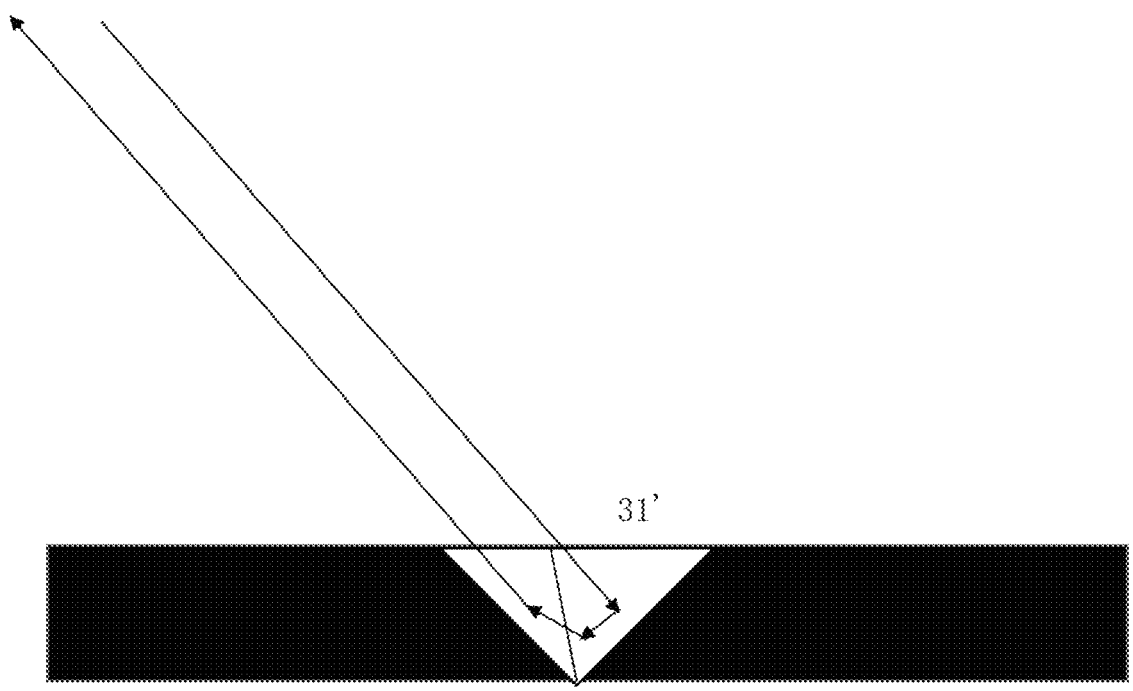

In another embodiment, the right-angled vertex micro-structure 31' may be a concave portion formed by imprinting a portion of one vertex of the above-described micro-structure body onto the base material 30 (with reference to FIG. 6C).

FIG. 6A, FIG. 6B and FIG. 6C show enlarged views of the right-angled vertex micro-structures in FIG. 5 and schematic diagrams of retroreflection paths. In the embodiment shown in FIG. 6A and FIG. 6B, the right-angled vertex micro-structure 31' is a transparent micro-structure body. Light from a transflective mirror is refracted by an incident surface (for example, an upper surface) of the right-angled vertex micro-structure 31' and is irradiated on a highly reflective coating of a thin film or curtain 30; after being subjected to three reflections, the light is emitted back to an emergent surface (for example, the upper surface) of the right-angled vertex micro-structure 31'; thereafter, the light is retroreflected again, and then is emitted to the transflective mirror. In the embodiment shown in FIG. 6C, the right-angled vertex micro-structure 31' is a concave portion; after being subjected to a transmission or a reflection of the transflective mirror, the light is directly incident on the concave portion, and after being subjected to three reflections, the light is emitted to the transflective mirror. The structure of the right-angled vertex micro-structure 31' allows the light to return to the transflective mirror almost along the original path (similarly, as observed macroscopically, it may be considered that the light returns along the original path).

Figure 7:
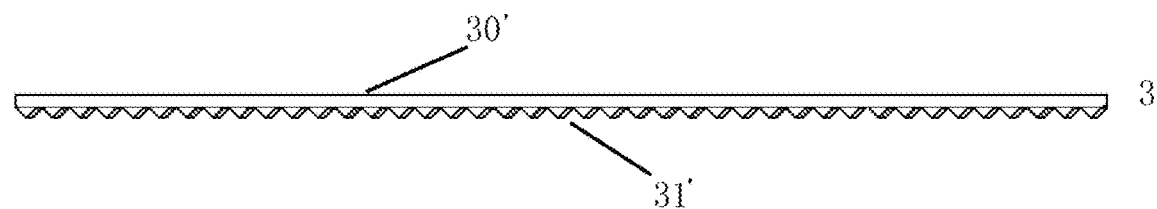
FIG. 7 schematically shows a retroreflective element according to still another embodiment of the present invention.

FIG. 7 shows a retroreflective element according to yet another embodiment of the present invention. A base material 30' of the retroreflective element 3 further has right-angled vertex micro-structures 31' evenly distributed thereon. The base material 30' itself is a transparent base material, and the right-angled vertex micro-structure 31' is also a transparent micro-structure body. Those faces of the right-angled vertex micro-structure 31' away from the base material 30' are coated with a highly reflective coating.

The right-angled vertex micro-structure 31' is preferably formed integrally with the base material 30'; or certainly they may also be separately formed and then the right-angled vertex micro-structure is attached onto the base material 30'. Preferably, the base material 30' and the right-angled vertex micro-structure 31' are made of the same material, or at least have the same refractive index.

Figure 8:
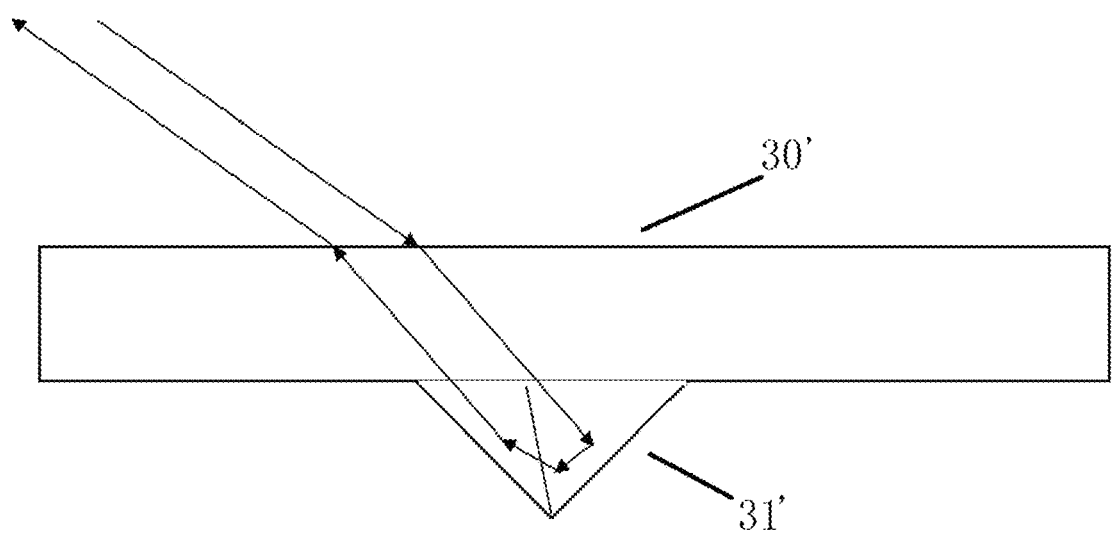
FIG. 8 schematically shows a schematic diagram of a micro-structure of a retroreflective element and a retroreflection path according to still another embodiment of the present invention.

FIG. 8 shows an enlarged view of the right-angled vertex micro-structure in FIG. 7 and a schematic diagram of a retroreflection path. Light from a transflective mirror is refracted by an upper surface of the base material 30' and is irradiated on a highly reflective coating of the right-angled vertex micro-structure 31'; after being subjected to three reflections, the light is emitted back to the upper surface of the base material 30'; and after being subjected to another refraction, the light is emitted to the transflective mirror. The structure of the right-angled vertex micro-structure 31' allows the light to return to the transflective mirror almost along the original path (as described above, as observed macroscopically, it may be considered that the light returns along the original path).

Figure 9:
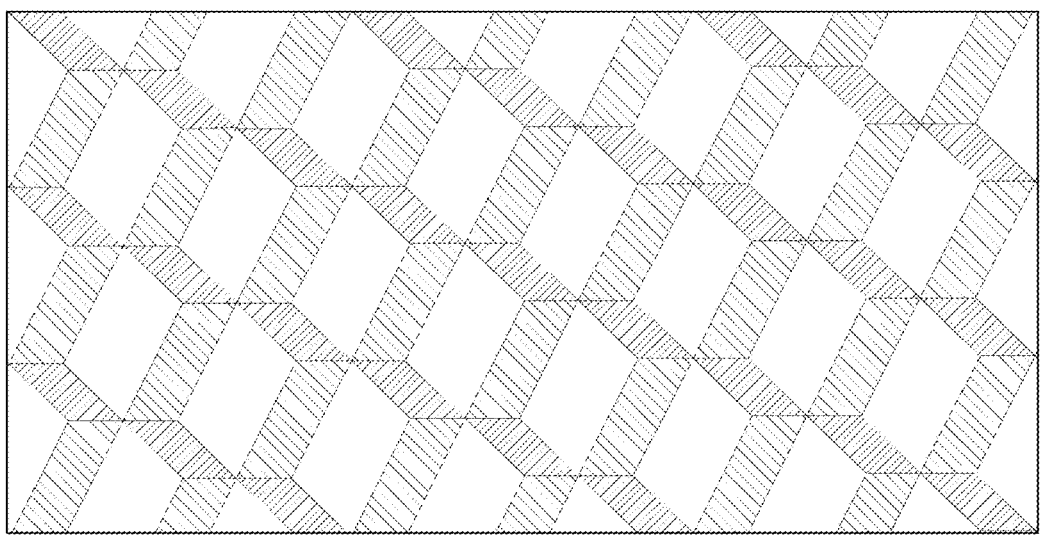
FIG. 9 schematically shows a top view of distribution of micro-structures of a retroreflective element according to an embodiment of the present invention.

FIG. 9 schematically shows a top view of distribution of micro-structures on a retroreflective element according to an embodiment of the present invention, for better understanding of the distribution of the micro-structures. As shown in the diagram, a plurality of micro-structures are sequentially distributed, closely adjacent to one another, and extend on the retroreflective element. It should be understood that, only a portion of the retroreflective element is shown in the diagram, and the micro-structures may be distributed throughout the retroreflective element in this manner. In addition, although the micro-structure shown in the diagram is a concave portion resembling a cuboid, it should be understood that, a shape of the micro-structure is not limited thereto, and may be any type of the micro-structure as described above.

As described above, microscopically, the retroreflective element still causes a certain offset between a reflection path and an incident path of the light; and meanwhile, due to a diffraction effect of the light, the reflected light will have a certain divergence angle. These two points are two core factors that affect definition of imaging in the air according to the present invention, and these two factors are also mutually constrained. The smaller the size of the micro-structure of the retroreflective element, the smaller a light offset caused thereby, but the larger a light spot caused by diffraction; on the contrary, the larger the size of the micro-structure, the smaller the light spot caused by diffraction, but the larger the light offset caused thereby. In order to overcome adverse effects of these two mutually constrained relationships on imaging definition, a relationship among a diameter of the micro-structure, a dot pitch of a pixel array of the source image, and an optical path from the real image to the retroreflective element is specifically designed in the present invention.

In general, an observation distance for an observer to observe the formed real image increases as the optical path from the real image to the retroreflective element increases, and preferably, the two are substantially linearly related to each other. For the observer, in consideration of a comfortable viewing angle, a picture width of the formed real image is preferably, for example, 1 to 2 times of the observation distance; and if the observer wants to obtain a sufficiently clear real image, then it is necessary for the number of observed pixel points to reach a certain value, for example, at least 1024 pixel points are present in each dimension; and thus, the dot pitch of the selected image source may be derived (the dot pitch of the image source determines a light spot size of the formed real image). In consideration of a visual effect of imaging in the air, in the present invention, the diameter of the micro-structure is set to be the same order of magnitude as the dot pitch of the image source, which is, preferably, about $1/5$, $1/4$, $1/3$, $1/2$ of, or equal to the dot pitch of the image source. Therefore, the optical path and the dot pitch of the light source (in case of a matrix light source) may be selected according to the observation distance of an actual application scenario, so as to further select the size of the micro-structure.

In one example, in case of an application scenario of, for example, a large advertisement display, etc., a relatively suitable observation distance is about 5 m, an imaging system with an optical path of 2 m or slightly longer may be selected, and a relatively suitable picture length of the real image is about 5 m, at which time, if a resolution of 1024 pixels is desired, a dot matrix image source having a dot pitch of about 5 mm may be used, and it may be derived by calculation that a preferred size of the micro-structure ranges from 0.6 mm to 4.4 mm, and more preferably, is about 1.7 mm.

In another example, in case of an application scenario of, for example, a general-size advertisement display, etc., a relatively suitable observation distance is about 1 m or more, an imaging system with an optical path of about 0.5 m may be selected, and a relatively suitable picture length of the real image is about 2 m; at which time, if a resolution of 1024 pixels is desired, a dot matrix image source having a dot pitch of about 2 mm may be used, and it may be derived by calculation that a preferred size of the micro-structure ranges from 0.43 mm to 1.57 mm, and more preferably, is about 0.82 mm.

In still another example, in case of an application scenario of, for example, a close-range or small-size display, etc., a relatively suitable observation distance is about 0.5 m or less, an imaging system with an optical path of about 0.1 m may be selected, and a relatively suitable picture length of the real image is about 1 m; at which time, if a resolution of 1024 pixels is desired, a dot matrix image source having a dot pitch of about 0.5 mm may be used, and it may be derived by calculation that a preferred size of the micro-structure ranges from 0.16 mm to 0.84 mm, and more preferably, is about 0.37 mm.

As described above, microscopically, the retroreflective element still causes a certain offset between a reflection path and an incident path of the light; and meanwhile, because of a diffraction effect of the light, the reflected light will have a certain divergence angle. An effect of light offset on the light spot size does not vary with an imaging distance, but varies linearly with a scale of the micro-structure. Therefore, it can be solved by using a method of reducing the size of a micro-structure unit, for example, ultra-fine processing, etc. A size of a spot caused by diffraction varies linearly with variation of the imaging distance, so it is a key factor to try to reduce light divergence caused by diffraction.

Figure 10:
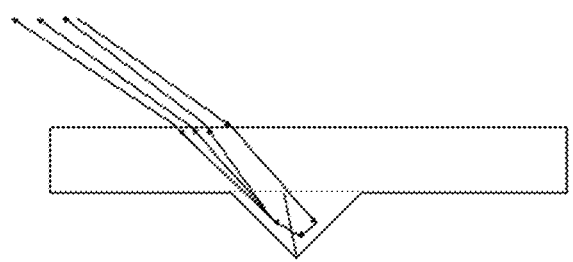
FIG. 10 shows a schematic diagram of a light path upon a right-angled triangular pyramid structure being used as a retroreflective unit according to an embodiment of the present invention.

As schematically shown in FIG. 10, upon a right-angled triangular pyramid structure being used as a retroreflective unit, incident light is refracted by an upper surface, and is irradiated on the right-angled triangular pyramid of the retroreflective unit; then the light is reflected thereon, and at a same time, due to Fraunhofer diffraction, diverges at a certain angle. Thereafter, the light is refracted by the upper surface of the retroreflective element, to form reflected light having a principal axis whose direction is opposite to that of the incident light, but with a small amount of offset and a certain divergence angle.

In order to minimize the adverse effect of light divergence caused by diffraction on imaging definition, a new design for the retroreflective unit is proposed in the present invention to reduce divergence caused by diffraction.

Figure 11:
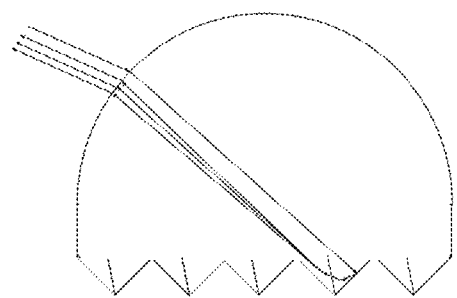
FIG. 11 shows a schematic diagram of a light path upon a combination of a right-angled triangular pyramid structure and a convex lens structure being used as a retroreflective unit according to an embodiment of the present invention.

As shown in FIG. 11, in one embodiment, a base portion of a retroreflective unit is divided into two main portions. A convex lens structure is used for forming a convex lens array on an upper portion of the base portion, that is, a side facing the transflective mirror. While a right-angled triangular pyramid structure is used for forming a right-angled triangular pyramid array on a lower portion of the base portion, that is, a side away from the transflective mirror. A transparent base material is used throughout the base portion. Meanwhile, a thickness of the base portion is designed such that the right-angled triangular pyramid structure of the lower portion is arrayed on a focal plane of the convex lens of the upper portion.

A highly reflective material layer is plated on a lower surface of the base portion, that is, a lower surface, or say, an outer side of the right-angled triangular pyramid structure. Thus, the incident light is refracted by an upper surface of the base portion, that is, an upper surface, or say, an outer side of the convex lens structure, and then is irradiated on the right-angled triangular pyramid; the light is reflected many times by the lower surface thereof, and at a same time, due to Fraunhofer diffraction, diverges at a certain angle; and thereafter, the light is refracted again on the upper surface of the retroreflective element. On a focusing principle of the convex lens, the refraction allows the light with a certain divergence angle to concentrate, and emit in a form of approximately parallel light. Thus, divergence caused by diffraction is reduced, and the spot size caused by diffraction can also be reduced even when the imaging distance is relatively long.

In this embodiment, each convex lens structure in the convex lens array has a diameter of about 1 mm, preferably less than 1 mm; and each right-angled triangular pyramid structure in the right-angled triangular pyramid array has an equilateral right-angled triangular pyramid structure, whose bottom face is an equilateral triangle; the bottom face has a side length of about 0.02 mm, and preferably less than 0.02 mm. In general, one convex lens structure corresponds to dozens of right-angled triangular pyramid structures; however, a case where one convex lens structure corresponds to one right-angled triangular pyramid structure may also be taken into consideration.

In this embodiment, reflectance of a reflective material layer plated on the lower surface of the base portion is as high as 60%, and preferably, as high as 70%, 80% or 90%.

In a preferred embodiment, the upper surface of the base portion is further plated with an anti-reflective material, such that transmittance of the surface is as high as 70%, and more preferably, as high as 80% or 90%.

As described above, in the system for imaging in the air shown in FIG. 1 and FIG. 2, it is necessary for the light emitted by the image source to be subjected to a reflection and a transmission (regardless of order) of the transflective mirror, as well as a reflection of the retroreflective element, so as to form an image. An approximate calculation formula of final imaging luminance L is:

$$L = L_0 \times T_g \times R_g \times \eta$$

$L_0$ is the luminance of the image source, $T_g$ and $R_g$ are respectively transmittance and reflectance of the transflective mirror, and $\eta$ is a reflection luminous efficacy of the retroreflective element.

With respect to a conventional transflective mirror, regardless of absorption of light energy by the base material, there is an approximate relationship as follows:

$$T_g = (1 - R_g)$$

Then $T_g \times R_g = (1 - R_g) \times R_g \leq 25\%$

Thus, it can be derived that, a luminous efficacy of the transflective mirror is less than or equal to ¼.

Figure 12:
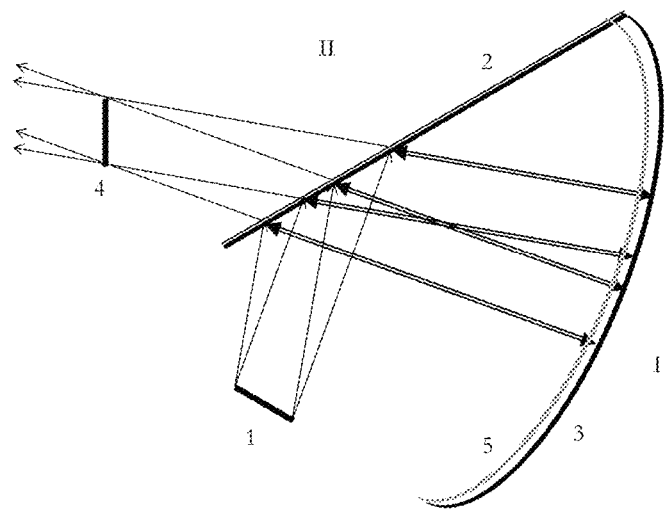
FIG. 12 schematically shows an imaging system for improving imaging luminance according to an embodiment of the present invention.

In order to improve the imaging luminance, the present invention further provides a technology for improving the luminous efficacy and enhancing the imaging luminance. FIG. 12 shows one embodiment of an imaging system for improving imaging luminance according to the technology.

Similar to the embodiment shown in FIG. 1, the system comprises an image source 1, a transflective mirror 2 and a retroreflective element 3. A plane where the transflective mirror 2 is located divides space into a first half region I and a second half region II, and both the image source 1 and the retroreflective element 3 are located in the first half region I.

Light emitted by the image source 1 is reflected by the transflective mirror 2 and is irradiated on the retroreflective element 3, and then the light is retroreflected on the retroreflective element 3, so that reflected light and incident light on the retroreflective element 3 are located in the same path, but in opposite directions. Therefore, the light is reflected by the retroreflective element 3 and then emerges along an original incident path (of course, as observed microscopically, a reflection path may be considered to be slightly offset from an incident path; however, as observed macroscopically, the two paths may be considered to coincide completely), and after being transmitted by the transflective mirror, then forms a real image 4 in the second half region II.

The image source 1 is an s-polarized light source; a selective transmissive film is plated on a side of the transflective mirror 2 that faces the image source 1, and the selective transmissive film is set to have higher reflectance with respect to s-polarized light, and higher transmittance with respect to p-polarized light. The selective transmissive film may be a single film layer, or may also be a plurality of film layers stacked. A component of the selective transmissive film is selected from special metal oxides, metal nitrides, metal oxynitride coatings, fluorides, and/or organic polymers; which may be one or more selected from the group consisting of tantalum pentoxide, titanium dioxide, magnesium oxide, zinc oxide, zirconium oxide, silicon dioxide, magnesium fluoride, silicon nitride, silicon oxynitride and aluminum fluoride.

As shown in FIG. 12, a side of the retroreflective element 3 that faces the transflective mirror 2 is further provided with a phase delay optical element 5, which is preferably a ¼ wave plate, such that light of the s-polarized light source emitted from the transflective mirror 2 to the retroreflective element 3 becomes circularly polarized light after passing through the phase delay optical element 5. The circularly polarized light, after being reflected by the retroreflective element 3, and then passing through the phase delay optical element 5, becomes the p-polarized light.

Average reflectance of the selective transmissive film with respect to the s-polarized light is greater than 70%, preferably greater than 80%, or even greater than 90%; while average transmittance thereof with respect to the p-polarized light is greater than 70%, preferably greater than 80%, or even greater than 90%.

With a case where the average reflectance of the selective transmissive film with respect to the s-polarized light is greater than 70%, while the average transmittance thereof with respect to the p-polarized light is also greater than 70% as an example. In a case that the light passes through the transflective mirror, its luminous efficacy should be greater than:

$$T_g \times R_g \approx 70\% \times 70\% = 49\%$$

The result is nearly doubled as compared with the luminous efficacy of, for example, 25% in the above-described system. Then, the final imaging luminance is also nearly doubled.

In a preferred embodiment, the image source 1 is selected to be an s-polarized light source emitting s-polarized light of a specific wavelength band, and the selective transmissive film is also set to have higher reflectance with respect to the s-polarized light of the specific wavelength band, and higher transmittance with respect to s-polarized light of other wavelength band and p-polarized light within a visible light band. For example, average reflectance with respect to the s-polarized light of the specific wavelength band is greater than 80%, or even greater than 90%; while average transmittance with respect to s-polarized light of other wavelength band and p-polarized light within a visible light band is greater than 80%, or even greater than 90%. The specific wavelength band may be, for example, red light of 590 nm to 690 nm, green light of 500 nm to 565 nm, and blue light of 410 nm to 480 nm.

With a case where the average reflectance of the selective transmissive film with respect to the s-polarized light of the specific wavelength band is greater than 80%, while the average transmittance with respect to p-polarized light within a visible light band is greater than 80% as an example. When the light passes through the transflective mirror, its luminous efficacy should be greater than:

$$T_g \times R_g \approx 80\% \times 80\% = 64\%$$

The result is increased by nearly 1.6 times, as compared with the luminous efficacy of, for example, 25% in the above-described system. Then, the final imaging luminance is also increased by nearly 1.6 times.

In another preferred embodiment, an anti-reflective film is further attached to a side of a transflective mirror 2 away from an image source 1, so as to increase light transmittance and improve a luminous efficacy. Preferably, the anti-reflective film may increase the light transmittance by up to 3%, or even above 5%.

Figure 13:
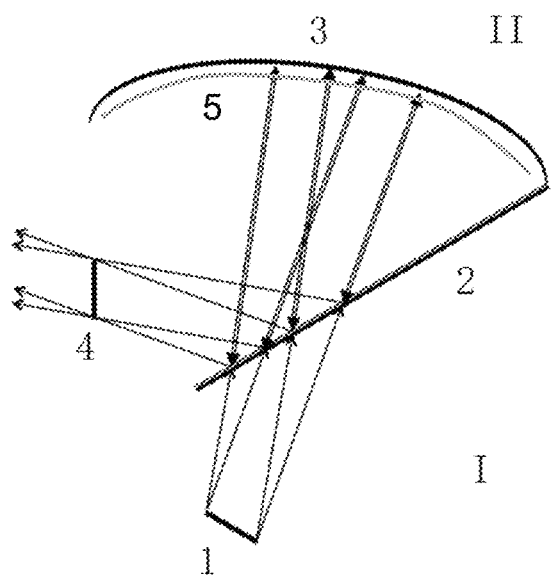
FIG. 13 schematically shows an imaging system for improving imaging luminance according to another embodiment of the present invention.

FIG. 13 shows another embodiment of an imaging system for improving imaging luminance according to the technology.

Similar to the embodiment shown in FIG. 2, the system comprises an image source 1, a transflective mirror 2 and a retroreflective element 3. A plane where the transflective mirror 2 is located divides space into a first half region I and a second half region II, the image source 1 is located in the first half region I, and the retroreflective element 3 is located in the second half region II.

Light emitted by the image source 1 is irradiated on the retroreflective element 3 after being transmitted by the transflective mirror 2, and then the light is opposing reflected by the retroreflective element 3, so that reflected light and incident light on the retroreflective element 3 are located in the same path, but in opposite directions. Therefore, the light is reflected by the retroreflective element 3 and then emerges along an original incident path (of course, as observed microscopically, a reflection path may be considered to be slightly offset from an incident path; however, as observed macroscopically, the two paths may be considered to coincide completely), and after being reflected by the transflective mirror, then forms a real image 4 in the second half region II.

The image source 1 adopts a p-polarized light source; a selective transmissive film is plated on a side of the transflective mirror 2 that faces the image source 1, and the selective transmissive film is set to have higher reflectance with respect to s-polarized light, and higher transmittance with respect to p-polarized light. The selective transmissive film may be a single film layer, or may also be a plurality of film layers stacked. A component of the selective transmissive film is selected from special metal oxides, metal nitrides, metal oxynitride coatings, fluorides, and/or organic polymers; which may be one or more selected from the group consisting of tantalum pentoxide, titanium dioxide, magnesium oxide, zinc oxide, zirconium oxide, silicon dioxide, magnesium fluoride, silicon nitride, silicon oxynitride and aluminum fluoride.

As shown in FIG. 13, a side of the retroreflective element 3 that faces the transflective mirror 2 is further provided with a phase delay optical element 5, which is preferably a ¼ wave plate, such that light of the p-polarized light source emitted from the transflective mirror 2 to the retroreflective element 3 becomes circularly polarized light after passing through the phase delay optical element 5. The circularly polarized light, after being reflected by the retroreflective element 3, and then passing through the phase delay optical element 5, becomes the s-polarized light.

Similar to the analysis mode of the embodiment in FIG. 12, average reflectance of the selective transmissive film with respect to the s-polarized light is high; while average transmittance thereof with respect to the p-polarized light is also high. Thus, in the embodiment in FIG. 13, final imaging luminance is also nearly doubled, as compared with the luminous efficacy of, for example, 25% in the above-described system.

Similarly, an anti-reflective film may also be used in the embodiment in FIG. 13, so as to increase the light transmittance and improve the luminous efficacy. Preferably, the anti-reflective film may increase the light transmittance by up to 3%, or even as high as 5%.

Based on the analysis of imaging luminance and imaging definition, in order to improve luminance and definition of imaging in the air, we further provide an improved structural design as follows: the retroreflective element is divided into a plurality of small pieces (retroreflective sub-elements), which are discretely distributed on one side of the transflective mirror according to a certain rule, such that an included angle between incident light and a center line of a retroreflective unit is as small as possible, and an optical path from each of the retroreflective sub-elements to the real image is as short as possible, which is favorable for improving imaging luminance and definition.

Figure 14A:
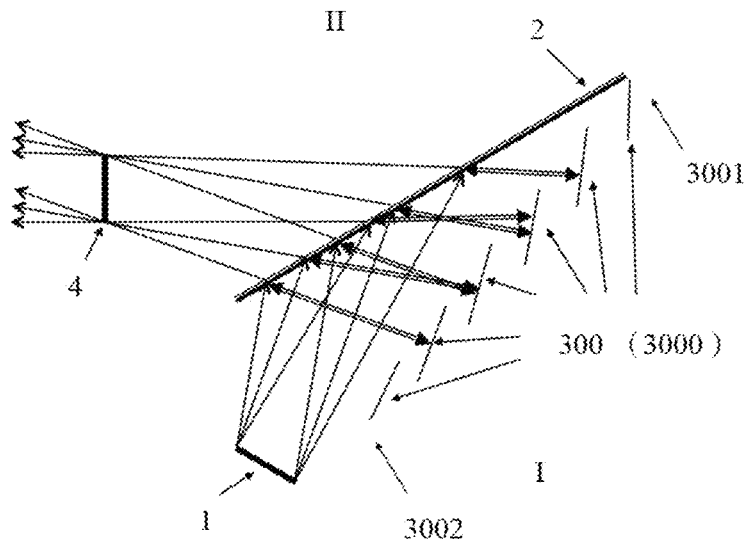
FIG. 14a and FIG. 14b schematically show an imaging system for improving imaging luminance and definition according to an embodiment of the present invention.
Figure 14B:
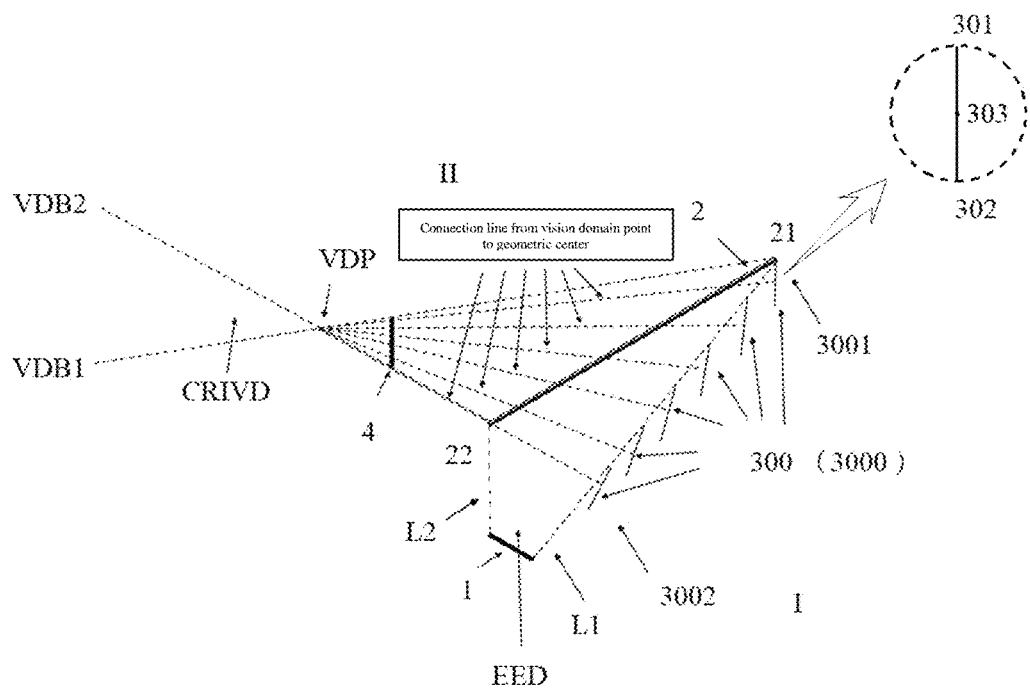

FIG. 14*a* and FIG. 14*b* show an embodiment of an imaging system for improving imaging luminance and definition according to the technology.

With reference to FIG. 14*a*, similar to the embodiment shown in FIG. 1, the system comprises: an image source 1, a transflective mirror 2 and a plurality of retroreflective sub-elements 300. A plane where the transflective mirror 2 is located divides space into a first half region I and a second half region II, and both the image source 1 and the retroreflective sub-elements 300 are located in the first half region I. The plurality of retroreflective sub-elements 300 form a retroreflective sub-element array 3000 (the reference sign 3000 and the reference sign 300 are noted in one position in the diagram for convenience).

Light emitted by the image source 1 is irradiated on the retroreflective sub-element 300 after being reflected by the transflective mirror 2, and then the light is retroreflected by the retroreflective sub-element 300, so that reflected light and incident light on the retroreflective sub-element 300 are located in the same path, but in opposite directions. Therefore, the light is reflected by the retroreflective sub-element 300 and then emerges along an original incident path (of course, as observed microscopically, a reflection path may be considered to be slightly offset from an incident path; however, as observed macroscopically, the two paths may be considered to coincide completely), and after being transmitted by the transflective mirror, then forms a real image 4 in the second half region II.

With further reference to FIG. 14*b*, there is a Complete Real Image Vision Domain (CRIVD) where the real image is completely visible as viewed from a side view of the system, the complete real image vision domain CRIVD has two vision domain boundaries VDB1 and VDB2 whose intersection point is a Vision Domain Point (VDP); the retroreflective sub-element array 3000 includes an array first end 3001 and an array second end 3002. The array first end 3001 is closer to the transflective mirror 2 while the array second end 3002 is farther away from the transflective mirror 2. A reverse extension line of the vision domain boundary VDB1 intersects with the transflective mirror 2 at a transflective mirror first point 21 closer to the array first end 3001, while a reverse extension line of the vision domain boundary VDB2 intersects with the transflective mirror 2 at a transflective mirror second point 22 farther away from the array first end 3001.

With continued reference to FIG. 14b, light emitted by the image source 1 has an Effective Exposure Region (EED) located between the image source 1 and the transflective mirror 2, the effective exposure region EED includes a first boundary L1 and a second boundary L2. The first boundary L1 is a connection line at a largest included angle to the transflective mirror 2 among connection lines from the transflective mirror first point 21 to respective light-emitting points of the image source 1, while the second boundary L2 is a connection line at a smallest included angle to the transflective mirror 2 among connection lines from the transflective mirror second point 22 to respective light-emitting points of the image source 1.

In the embodiment shown in FIG. 14a and FIG. 14b, each of the retroreflective sub-elements 300 includes a substantially planar base material, and a large number of retroreflective units (not shown) having a reflecting surface distributed on the base material. The retroreflective unit has a right-angled vertex micro-structure, the right-angled vertex micro-structure has at least one right-angled vertex, and three edges of the right-angled vertex are at right angles to one another. A straight line passing through the right-angled vertex and having equal included angles (each of which is about 54.7°) to the three edges of the right-angled vertex micro-structure is defined as a center line of the right-angled vertex micro-structure. In some preferred embodiments, an included angle between a center line of a right-angled vertex micro-structure and a normal of a base material plane is required to be as small as possible, which is, for example, less than 15°, less than 10°, less than 5°, or even 0°.

With reference to a partially enlarged portion in FIG. 14b, each of the retroreflective sub-elements 300 includes a sub-element first end 301 and a sub-element second end 302. In general, the sub-element first end 301 located above while the sub-element second end 302 is located below, so that the sub-element 300 is set vertically, or preferably, at a certain angle to a vertical direction.

In some preferred embodiments, in a case where a position of each sub-element first end 301 is determined, an angle of the retroreflective sub-element 300 to the vertical direction is adjusted such that an included angle between a connection line from a geometric center 303 (with reference to the partially enlarged portion in FIG. 14b) of the retroreflective sub-element 300 to the vision domain point VDP and a center line of the right-angled vertex micro-structure on the retroreflective sub-element 300 is less than 15 degrees, preferably less than 10°, more preferably less than 5°, and most preferably, 0°; and thus, a reflected luminous efficacy is as high as possible.

In some preferred embodiments, a retroreflective sub-element array 3000 is arranged such that each of the retroreflective sub-elements 300 does not shield light of the image source 1 that is emitted to the transflective mirror 2, which can ensure no imaging loss because the light from the image source 1 to the real image 4 is not shielded.

For example, each sub-element first end 301 and each sub-element second end 302 fall outside the effective exposure region EED, so that the light from the image source 1 to the real image 4 is not shielded. More preferably, each sub-element first end 301 falls on the first boundary L1, and each sub-element second end 302 falls outside the effective exposure region EED; which, thus, can further ensure that an optical path from the retroreflective sub-element 300 to the formed real image 4 is as short as possible.

In some preferred embodiments, a retroreflective sub-element array 3000 is arranged such that reverse extension lines of all light rays forming a real image 4 can fall on a certain retroreflective sub-element 300, which, thus, can ensure no imaging loss because the light from the image source 1 to the real image 4 does not subjected to a reflection.

For example, as shown in FIG. 14b, as viewed from the side view of the system, all the retroreflective sub-elements 300 of the array 3000 are sequenced in a short-to-long order of a distance to the transflective mirror first point 21; a position of a retroreflective sub-element 300 having a shortest distance to the transflective mirror first point 21 is defined as the foremost, and a position of a retroreflective sub-element 300 having a longest distance to the transflective mirror first point 21 is defined as the last. In adjacent two retroreflective sub-elements 300, a connection line from a sub-element second end 302 of a former retroreflective sub-element 300 to the vision domain point VDP and the first boundary L1 form an intersection point, while a connection line from a sub-element first end 301 of a latter retroreflective sub-element 300 to the vision domain point VDP and the first boundary L1 also form an intersection point, and the former intersection point is located behind, or at least overlaps with the latter intersection point, which ensures all light rays emitted by the image source 1 that subject to a first reflection of the transflective mirror 2 to the array 3000 are reflected back in an opposite direction, without being missed.

Figure 15A:
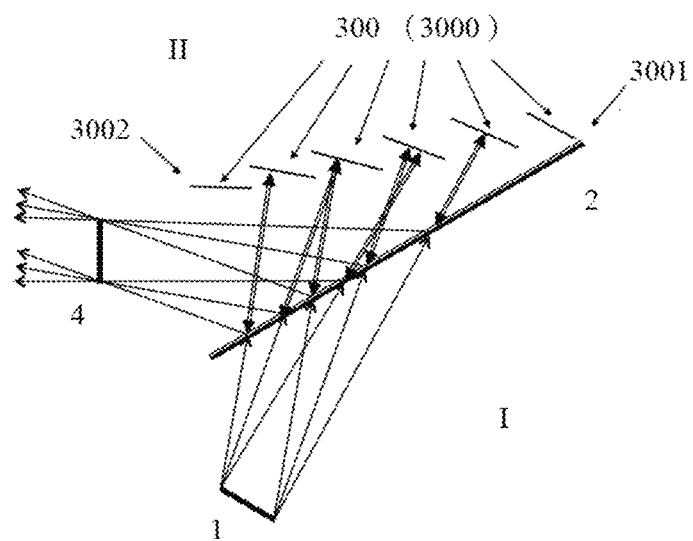
FIG. 15a and FIG. 15b schematically show an imaging system for improving imaging luminance and definition according to another embodiment of the present invention.
Figure 15B:
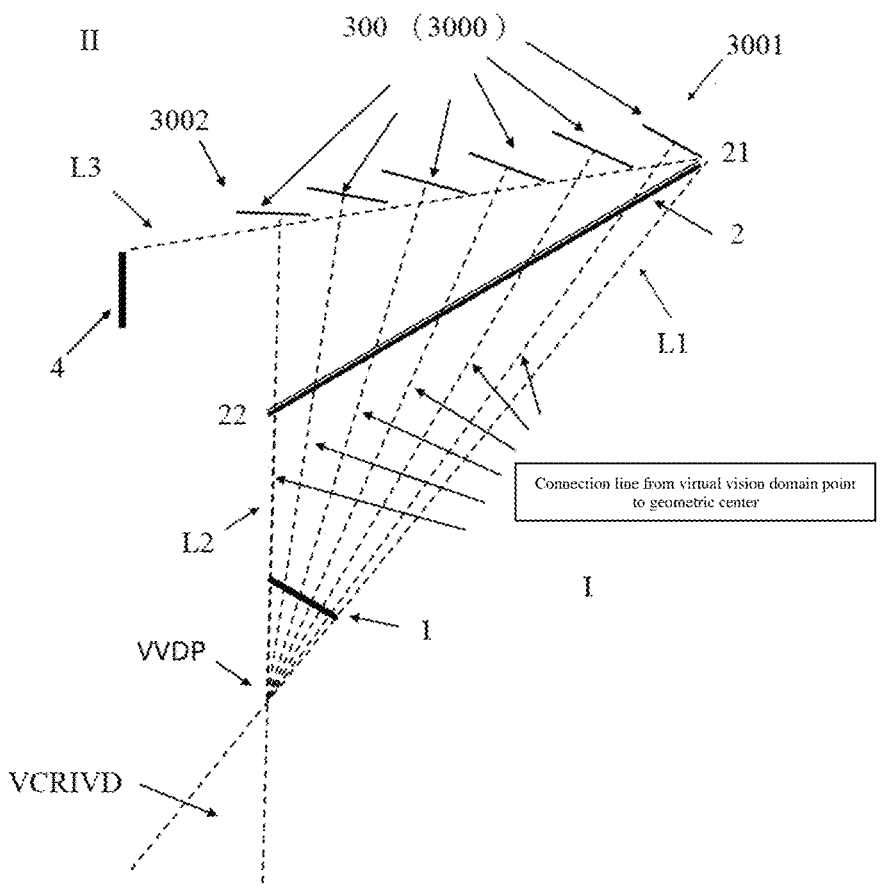

FIG. 15a and FIG. 15b schematically show an imaging system for improving imaging luminance and definition according to another embodiment of the present invention.

With reference to FIG. 15a, similar to the embodiment shown in FIG. 2, the system comprises an image source 1, a transflective mirror 2 and a plurality of retroreflective sub-elements 300. A plane where the transflective mirror 2 is located divides space into a first half region I and a second half region II, and the image source 1 is located in the first half region I, while the plurality of retroreflective sub-elements 300 are located in the second half region II. The plurality of retroreflective sub-elements 300 form a retroreflective sub-element array 3000 (the reference sign 3000 and the reference sign 300 are noted in one position in the diagram for convenience).

Light emitted by the image source 1 is irradiated on the retroreflective sub-element 300 after being transmitted by the transflective mirror 2, and then the light is retroreflected by the retroreflective sub-element 300, so that reflected light and incident light on the retroreflective sub-element 300 are located in the same path, but in opposite directions. Therefore, the light is reflected by the retroreflective sub-element 300 and then emerges along an original incident path (of course, as observed microscopically, a reflection path may be considered to be slightly offset from an incident path; however, as observed macroscopically, the two paths may be considered to coincide completely), and after being reflected by the transflective mirror, then forms a real image 4 in the second half region II.

In this embodiment, the light emitted by the image source 1 is transmitted (rather than reflected) by the transflective mirror 2 and then reaches the retroreflective sub-element 300. While the light reflected by the retroreflective sub-element 300 is reflected (rather than transmitted) by the transflective mirror 2, and then forms the real image 4. The finally formed real image 4 and the retroreflective sub-element 300 are located in the same half region, rather than different half regions.

Similar to FIG. 14b, as viewed from a side view, the system in FIG. 15b also comprises a complete real image vision domain CRIVD, a vision domain point VDP, two vision domain boundaries VDB1 and VDB2 (not shown in FIG. 15b); also comprises an effective exposure region EED, as well as a first boundary L1 and a second boundary L2; and further comprises an array first end 3001 and an array second end 3002 of the retroreflective sub-element array 3000, a transflective mirror first point 21 and a transflective mirror second point 22. The system in FIG. 14b is referred to for definitions of all these features. Configuration of the microstructure in the system of FIG. 15b is also consistent with that according to the embodiment shown in FIG. 14b.

In addition, a third boundary L3 is defined as a line that is mirror-symmetrical to the first boundary L1 with respect to the transflective mirror 2, an effective imaging region EID is defined as a region that is mirror-symmetrical to the effective exposure region EED with respect to the transflective mirror 2, and a virtual vision domain point VVDP is defined as a point that is mirror-symmetrical to the vision domain point VDP with respect to the transflective mirror 2.

In FIG. 15b, in general, a sub-element first end 301 of each of the retroreflective sub-elements 300 is on the right (closer to the transflective mirror 2), and a sub-element second end 302 is on the left (farther away from the transflective mirror 2), so that the sub-element 300 is arranged horizontally, or preferably at a certain angle to a horizontal direction.

In some preferred embodiments, in a case where a position of each sub-element first end 301 is determined, an angle of the retroreflective sub-element 300 to the horizontal direction is adjusted such that an included angle between a connection line from a geometric center 303 of the retroreflective sub-element 300 to the virtual vision domain point VVDP and a center line of the right-angled vertex micro-structure on the retroreflective sub-element 300 is less than 15 degrees, preferably less than 10°, more preferably less than 5°, and most preferably, 0°; and thus, a reflected luminous efficacy is as high as possible.

In some preferred embodiments, the retroreflective sub-element array 3000 is arranged such that respective retroreflective sub-elements 300 do not shield light of the image source 1 that is emitted to the transflective mirror 2, which, thus, can ensure no imaging loss because the light from the image source 1 to the real image 4 is not shielded.

For example, each sub-element first end 301 and each sub-element second end 302 fall outside the effective imaging region EID, so that the light from the image source 1 to the real image 4 is not shielded. More preferably, each sub-element first end 301 falls on the first boundary L1, and each sub-element second end 302 falls outside the effective imaging region EID; which, thus, can further ensure that the optical path from the retroreflective sub-element 300 to the real image 4 is as short as possible.

In some preferred embodiments, the retroreflective sub-element array 3000 is arranged such that extension lines of all light rays emitted by the image source 1 within the effective exposure region EED can fall on a certain retroreflective sub-element 300, which, thus, can ensure no imaging loss because the light from the image source 1 to the real image 4 does not escape a reflection.

For example, as shown in FIG. 15b, as viewed from the side view of the system, all the retroreflective sub-elements 300 of the array 3000 are sequenced in a short-to-long order of a distance to the transflective mirror first point 21; a position of a retroreflective sub-element 300 having a shortest distance to the transflective mirror first point 21 is defined as the foremost, and a position of a retroreflective sub-element 300 having a longest distance to the transflective mirror first point 21 is defined as the last. In adjacent two retroreflective sub-elements 300, a connection line from a sub-element second end 302 of the former retroreflective sub-element 300 to a virtual vision domain point VVDP and a third boundary L3 form an intersection point, while a connection line from a sub-element first end 301 of the latter retroreflective sub-element 300 to the virtual vision domain point VVDP and the third boundary L3 also form an intersection point, and the former intersection point is located behind, or at least overlaps with the latter intersection point, which ensures all light rays emitted by the image source 1 that subject to a first transmittance of the transflective mirror 2 to the array 3000 are reflected back in an opposite direction, without being missed.

Similar to a case where a single piece of retroreflective element is used, in a further embodiment of the present invention (not shown), the above-described two embodiments may be combined, two retroreflective element arrays are used, resulting in imaging with stronger luminance. Additionally or alternatively, two image sources may also be used.

It should be understood that, in the present invention, although in most cases, the reflecting surface (for example, the surface coated with the highly reflective coating) in the retroreflective element is described as a portion attached onto the base material, yet the reflecting surface may also be considered as a portion attached onto the micro-structure. For example, the retroreflective element may be divided into a large number of retroreflective units, each retroreflective unit includes a micro-structure having a reflecting surface; the micro-structure may be the spherical micro-structure or the right-angled vertex micro-structure as described above. Alternatively, the reflecting surface may even be described as an independent structural unit. For example, each retroreflective unit includes a reflecting surface, and the reflecting surface may be attached onto at least one of the first material and the second material thereon; and the reflecting surface may be formed by one or more faces of the above-described micro-structure.

According to the present invention, an image may be formed directly in the air, or even in vacuum, neither with the help of an auxiliary device such as a helmet, nor with the help of an imaging screen or a particulate medium in the air. It is a real technology of imaging in the air. The image formed is suspended in the air, so a large number of interactions and applications may be developed, which is of epoch-making significance.

It should be understood that, the above description of the disclosed embodiments enables those skilled in the art to implement or use the present invention. It should be understood that, the features disclosed in the foregoing embodiments may be used separately or in combination, unless otherwise specified. Various modifications to these embodiments are obvious to those skilled in the art, and the general principles defined herein may be implemented in other embodiments without departing from the spirit or scope of the present invention. Therefore, the present invention as disclosed herein is not limited to the specific embodiments disclosed, but is intended to cover modifications within the spirit and scope of the present invention as defined in the appended claims.

What is claimed is:

1. A system for imaging in air, comprising: an image source, a transflective mirror and a retroreflective element; wherein light emitted by the image source is irradiated on the retroreflective element after being reflected by the transflective mirror, the light is reflected by the retroreflective element and emerges in an opposite direction along an original incident path, and then forms a real image in the air after being transmitted by the transflective mirror;

wherein the transflective mirror comprises a selective transmissive film on a side of the transflective mirror facing the image source, the selective transmissive film is configured to have a reflectance to first linearly polarized light greater than a reflectance to second linearly polarized light, and a transmittance to the second linearly polarized light greater than a transmittance to the first linearly polarized light, a polarization direction of the first linearly polarized light is perpendicular to a polarization direction of the second linearly polarized light; and a phase delay optical element is provided between the retroreflective element and the transflective mirror such that the first linearly polarized light of the image source incident on the retroreflective element from the transflective mirror becomes circularly polarized light after passing through the phase delay optical element;

the retroreflective element comprises a large number of micro-structures for retroreflecting, and a relationship among a diameter of the micro-structures, a dot pitch of a pixel array of the source image, and an optical path from the real image to the retroreflective element is designed as that the diameter of the micro-structures has a linear relationship with the dot pitch, and the optical path has a linear relationship with a square of the dot pitch.

2. The system according to claim 1, wherein a component of the selective transmissive film comprises one of a metal oxide, a metal nitride, a metal oxynitride coating film and an organic polymer.

3. The system according to claim 1, wherein the selective transmissive film comprises one or more film layers, and a component of each film layer comprises one of a metal oxide, a metal nitride, a metal oxynitride coating film, and an organic polymer.

4. The system according to claim 1, wherein the image source comprises a polarized light source.

5. The system according to claim 4, wherein the polarized light source is an s-polarized light source, the first linearly polarized light is s-polarized light, the second linearly polarized light is p-polarized light, and the s-polarized light source is located on a side of the transflective mirror facing the retroreflective element.

6. The system according to claim 5, wherein the light emitted by the image source is selected to be s-polarized light of a specific wavelength band, and the selective transmissive film is configured to have a reflectance of greater than 70% for the s-polarized light of the specific wavelength band, and a transmittance of greater than 70% for s-polarized light of other wavelength bands and p-polarized light within a visible light band.

7. The system according to claim 5, wherein the selective transmissive film has an average reflectance of greater than 80% or 90% for the s-polarized light.

8. The system according to claim 5, wherein the selective transmissive film has an average transmittance of greater than 80% or 90% for the p-polarized light.

9. The system according to claim 1, wherein the phase delay optical element is a 1/4 wave plate.

10. The system according to claim 1, wherein an anti-reflective film is attached to a side of the transflective mirror away from the image source.

11. The system according to claim 1, wherein a relationship between the diameter of the micro-structures and the optical path from the real image to the retroreflective element is designed as that upon the optical path being selected, an area of the micro-structures is designed to be inversely proportional to a wavelength of the light emitted by the image source; and/or, the diameter of the micro-structures is less than or equal to half of the dot pitch of the pixel array of the source image.

12. The system according to claim 1, wherein a preset observation distance has a linearly relationship with the optical path from the real image to the retroreflective element, and the dot pitch of the pixel array of the source image is selected to be positively proportional to the preset observation distance.

13. The system according to claim 1, wherein the retroreflective element comprises a base material and micro-structures distributed on the base material, a reflecting surface is provided on one of the base material and the micro-structures.

14. The system according to claim 13, wherein the base material has the reflecting surface, at least one of the micro-structures comprises a right-angled vertex micro-structure, the right-angled vertex micro-structure has at least one right-angled vertex, three edges of the right-angled vertex are at right angles to each other; or at least one of the micro-structures comprises a right-angled vertex micro-structure, the right-angled vertex micro-structure has at least one right-angled vertex, three edges of the right-angled vertex are at right angles to one another, and three faces formed by the three edges intersecting with one another in a pairwise manner or at least a portion region thereof form the reflecting surface.

15. The system according to claim 13, wherein at least one of the micro-structures is a spherical micro-structure made of a transparent material, and a surface of a portion of the spherical micro-structure away from the transflective mirror is configured to reflect the light.

16. The system according to claim 1, wherein the retroreflective element comprises a plurality of micro-structures for retroreflecting, each micro-structure comprises a convex lens unit and a plurality of right-angled triangular pyramid units, the convex lens unit is located on a light incident side of the plurality of right-angled triangular pyramid units, a surface of the plurality of right-angled triangular pyramid units away from the convex lens unit comprises a reflecting surface, and the plurality of right-angled triangular pyramid units are arranged on a focal plane of the convex lens unit.

17. The system according to claim 1, wherein the retroreflective element comprises an array including a plurality of retroreflective sub-elements, each of the retroreflective sub-elements comprises a base material, and a large number of retroreflective units having a reflecting surface are distributed on the base material; the retroreflective unit is a right-angled vertex micro-structure, the right-angled vertex micro-structure has at least one right-angled vertex, three edges of the right-angled vertex are at right angles to one another; and an included angle between a center line of the right-angled vertex micro-structure and a normal of the base material plane is less than 15 degrees, the center line is at equal included angles to all of the three edges of the right-angled vertex micro-structure.

18. A system for imaging in air, comprising: an image source, a transflective mirror and a retroreflective element; wherein
light emitted by the image source is irradiated on the retroreflective element after being transmitted by the transflective mirror, the light is reflected by the retroreflective element and emerges in an opposite direction along an original incident path, and then forms a real image in the air after being reflected by the transflective mirror;
wherein the transflective mirror comprises a selective transmissive film on a side of the transflective mirror facing the image source, the selective transmissive film is configured to have a reflectance to first linearly polarized light greater than a reflectance to second linearly polarized light, and a transmittance to the second linearly polarized light greater than a transmittance to the first linearly polarized light, a polarization direction of the first linearly polarized light is perpendicular to a polarization direction of the second linearly polarized light; and
a phase delay optical element is provided between the retroreflective element and the transflective mirror such that the second linearly polarized light of the image source incident on the retroreflective element from the transflective mirror becomes circularly polarized light after passing through the phase delay optical element;
the retroreflective element comprises a large number of micro-structures for retroreflecting, and a relationship among a diameter of the micro-structures, a dot pitch of a pixel array of the source image, and an optical path from the real image to the retroreflective element is designed as that the diameter of the micro-structures has a linear relationship with the dot pitch, and the optical path has a linear relationship with a square of the dot pitch.

19. The system according to claim 18, wherein the image light source is a p-polarized light source, the first linearly polarized light is s-polarized light, the second linearly polarized light is p-polarized light, and the p-polarized light source is located on a side of the transflective mirror away from the retroreflective element.

20. A system for imaging in air, comprising: an image source, a transflective mirror and a retroreflective element; wherein
light emitted by the image source is irradiated on the retroreflective element after being reflected by the transflective mirror, the light is reflected by the retroreflective element and emerges in an opposite direction along an original incident path, and then forms a real image in the air after being transmitted by the transflective mirror;
wherein the transflective mirror comprises a selective transmissive film on a side of the transflective mirror facing the image source, the selective transmissive film is configured to have a reflectance to first linearly polarized light greater than a reflectance to second linearly polarized light, and a transmittance to the second linearly polarized light greater than a transmittance to the first linearly polarized light, a polarization direction of the first linearly polarized light is perpendicular to a polarization direction of the second linearly polarized light; and
a phase delay optical element is provided between the retroreflective element and the transflective mirror such that the first linearly polarized light of the image source incident on the retroreflective element from the transflective mirror becomes circularly polarized light after passing through the phase delay optical element;
the image source is an s-polarized light source, the first linearly polarized light is s-polarized light, the second linearly polarized light is p-polarized light, and the s-polarized light source is located on a side of the transflective mirror facing the retroreflective element;
the light emitted by the image source is selected to be s-polarized light of a specific wavelength band, and the selective transmissive film is configured to have a reflectance of greater than 70% for the s-polarized light of the specific wavelength band, and a transmittance of greater than 70% for s-polarized light of other wavelength bands and p-polarized light within a visible light band, the specific wavelength band comprises red light of 590 nm to 690 nm, green light of 500 nm to 565 nm, and blue light of 410 nm to 480 nm.

* * * * *

UNITED STATES PATENT AND TRADEMARK OFFICE
CERTIFICATE OF CORRECTION

PATENT NO. : 11,630,250 B2  
APPLICATION NO. : 16/467607  
DATED : April 18, 2023  
INVENTOR(S) : Junfeng Xu Page 1 of 1

It is certified that error appears in the above-identified patent and that said Letters Patent is hereby corrected as shown below:

On the Title Page

(73) Assignee Should read: --FUTURUS TECHNOLOGY CO., LTD., BEIJING (CN)--.

Signed and Sealed this  
Eleventh Day of July, 2023

Katherine Kelly Vidal  
*Director of the United States Patent and Trademark Office*